United States Patent
Xu et al.

(10) Patent No.: US 7,400,291 B2
(45) Date of Patent: Jul. 15, 2008

(54) LOCAL POSITIONING SYSTEM WHICH OPERATES BASED ON REFLECTED WIRELESS SIGNALS

(75) Inventors: Jin Xu, Singapore (SG); Kanzo Okada, Singapore (SG); Xiaobing Sun, Singapore (SG); Yugang Ma, Singapore (SG); Wei Lu, Singapore (SG)

(73) Assignee: Sony Corporation, Tokyo (JP)

( * ) Notice: Subject to any disclaimer, the term of this patent is extended or adjusted under 35 U.S.C. 154(b) by 298 days.

(21) Appl. No.: 10/922,749

(22) Filed: Aug. 20, 2004

(65) Prior Publication Data

US 2005/0122252 A1    Jun. 9, 2005

(30) Foreign Application Priority Data

Dec. 4, 2003    (SG)    ............................. 200307132-1

(51) Int. Cl.
*G01S 13/08* (2006.01)
(52) U.S. Cl. .................. 342/118; 342/146; 342/191
(58) Field of Classification Search .................. 342/118
See application file for complete search history.

(56) References Cited

U.S. PATENT DOCUMENTS

| | | | | |
|---|---|---|---|---|
| 4,862,152 | A * | 8/1989 | Milner | ........................ 345/158 |
| 5,345,539 | A * | 9/1994 | Webb | ........................ 706/24 |
| 5,774,632 | A * | 6/1998 | Kaske | ........................ 706/25 |
| 6,018,696 | A * | 1/2000 | Matsuoka et al. | ........... 701/207 |
| 6,112,095 | A | 8/2000 | Wax et al. | |
| 6,304,218 | B1 | 10/2001 | Sugiura et al. | |
| 6,347,264 | B2 * | 2/2002 | Nicosia et al. | ................. 701/16 |
| 6,366,236 | B1 | 4/2002 | Farmer et al. | |
| 6,487,417 | B1 | 11/2002 | Rossoni et al. | |
| 2004/0162647 | A1 * | 8/2004 | Koshizen et al. | ............... 701/2 |

FOREIGN PATENT DOCUMENTS

| | | |
|---|---|---|
| GB | 2261510 | 5/1993 |
| GB | 2261511 | 5/1993 |

OTHER PUBLICATIONS

Janét et al., "Using a Hyper-Ellipsoid Clustering Kohonen for autonomous Mobile Robot Map Building, Place Recognition and Motion Planning", International Conference on Neural Networks, Jun. 1997. vol. 3, pp. 1699-1704.*

Jacak et al., "Neural Network-Based Modeling of Robot Action Efects in Conceptual State Space of Real World", 1996 IEEE/RSJ International Conference on Intelligent Robots and Systems, Nov. 1996. vol. 3, pp. 1149-1156.*

(Continued)

*Primary Examiner*—Thomas H. Tarcza
*Assistant Examiner*—Matthew M Barker
(74) *Attorney, Agent, or Firm*—Frommer Lawrence & Haug LLP; William S. Frommer; Thomas F. Presson

(57) ABSTRACT

A local positioning system is proposed for wirelessly locating an object using existing features within a static environment, such as walls, as the references for determining the position of the system. An antenna 16 attached to the object transmits RF signals which are reflected by the surroundings. During a training mode, the reflected signals are used to train a neural network 22, 43 to map the position of the object to the characteristics of the reflected signals. During a working mode, the trained neural network is to identify the position of the object based on reflected signals in working mode. Optionally, the reflected signals may be subject to a clustering process before input to the neural network.

34 Claims, 12 Drawing Sheets

OTHER PUBLICATIONS

Zimmer et al., "Realtime-learning on an Autonomous Mobile Robot with Neural Networks", Sixth Euromicro Workshop on Real-Time Systems, Jun. 1994, pp. 40-44.*

Sethi et al., "A Neural Netowrk Approach To Robot Localization Using Ultrasonic Sensors", Department of Computer Science, Wayne State University, Detroit, pp. 513 to 517.

Iocchi et al., "Self-Localization in the RobotCup Environment", Dipartimento di Informatica e Sistemistica, Universita di Roma "La Sapienza" Via Salaria 113, 00198, Roma, Italy.

Einsele, "Real-Time Self-Localization in Unknown Indoor Environments using a Panorama Laser Range Finder", Laboratory for Process Control and Real-Time Systems, Technische Universitat Munchen, Germany.

* cited by examiner

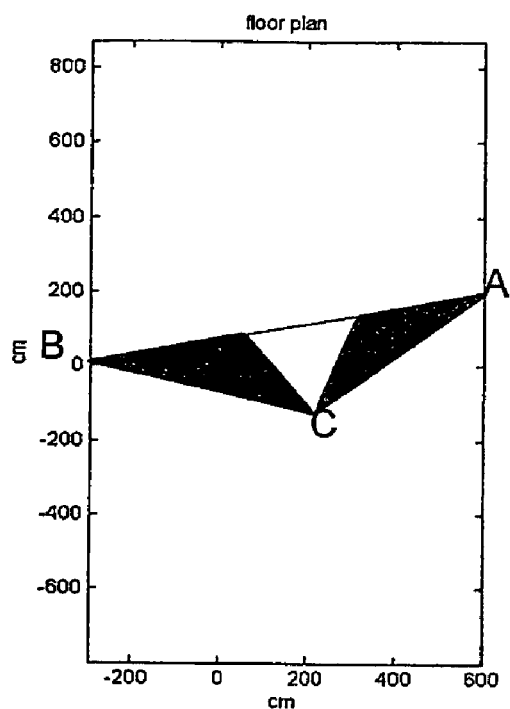
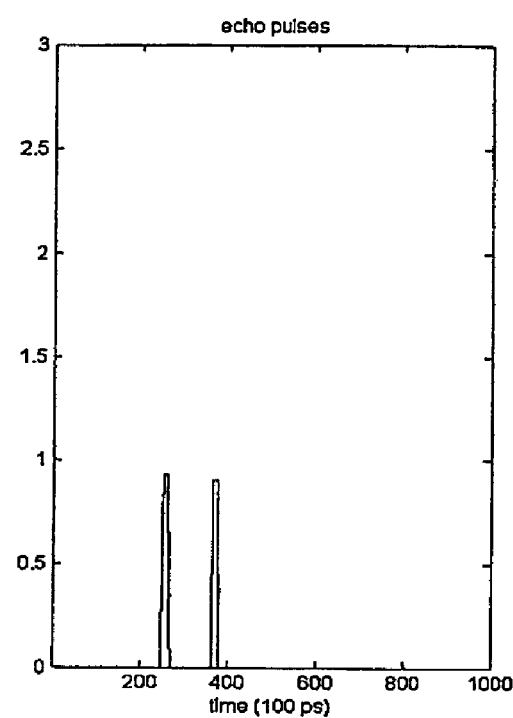
Fig 7(a)　　　　　　　　　　　Fig 7(b)
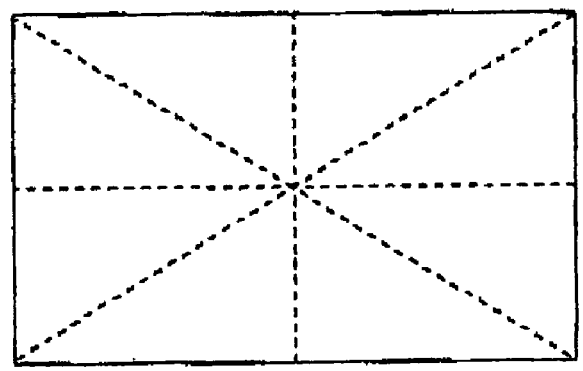
Fig. 7(c)

LOCAL POSITIONING SYSTEM WHICH OPERATES BASED ON REFLECTED WIRELESS SIGNALS

FIELD OF THE INVENTION

The present invention relates to a method for detecting the position of an object wirelessly, for example within an indoor environment, and to a system for detecting its own position.

BACKGROUND OF INVENTION

Many methods determining the position of an object using a transmitter/receiver device in conjunction with at least one active/reflective device situated at a pre-determined position as a point of reference. Frequently, a system is provided which is capable of monitoring its own position relative to the active/reflective device, and this system is attached to the object.

The best known of such systems is the GPS system, in which the position of a GPS receiver located on the surface of the earth is determined using 27 Earth-orbiting satellites (of which 24 are in operation at any time). The distances between the receiver and at least three of the satellites are determined by measuring the travelling time of radio waves between them. Subsequently, a 3D trilateration method can be applied to determine the receiver's location on the planet (see Marshall Brain & Tom Harris, "How GPS receivers work", http://electronics.howstuffworks.com/gps.htm). The calculations are dependent on an almanac in the receivers detailing the position of the satellites at any given time.

U.S. Pat. Nos. 5,977,958 and 6,054,950 describe methods for measuring time-of-arrival with ultrashort RF pulses (UWB) transmitted from the transmitter to an array of receivers. Despite the differences in technical details, both patents require devices at pre-known positions. U.S. Pat. No. 5,977,958 uses 4 receivers for its 2D scenario and U.S. Pat. No. 6,054,950 needs at least 4 receivers or beacons for 3D applications (these receivers or beacons are here termed "explicit references"). There are other similar technologies which are based on angles of arrival of received signals instead of their times of arrival. In such technologies, multiple references are needed. The problem with this type of system is the requirement for references at pre-known positions. This increases the number of devices needed and introduces difficulty in setting up the systems in certain situations or surroundings. Furthermore, such systems require direct line of sight (LOS) between the transmitter and receivers, the performance decreases sharply in the areas where LOS is not available.

Self-positioning methods employed in robotics often use a ring of ultrasonic transducers or laser range finders to get a measurement of the respective distance from an object to a surrounding environment in each of a number of directions. A sonar/laser range image can be formed from the distances between the detector and nearby objects. This image can be compared to a known floor plan or trained database in order to find the location of the robot. However, these methods involve multiple directional sensors (e.g. a ring of ultrasonic sensors around the robot) or scanning mechanism (e.g. a scanning laser range finder) and are highly complex.

Cameras are also used for positioning purposes. Optical images of surroundings captured at a certain location with a certain orientation (or information abstracted from these images subsequently) can be compared to a database, to determine the current position and bearing of the robot. However, such systems can only work in special environments where specific visible features (e.g. straight lines) are available. Another disadvantage is that daunting computing resources are needed for image processing in these systems.

Another U.S. Pat. No. 6,112,095 proposes a method of location determination in which a transmitter transmits a radio signal and a receiver device uses an array of antennas to receive the signal both directly and along paths which include reflections (multipath signals). Different locations of the transmitter cause the set of reflected paths to be different, so that the received signals constitute a signature of the position. The determination of the location of the transmitter is based on a set of pre-calibrated signal covariance matrices corresponding to possible transmitter locations. However, the uniqueness of the signature is, in principle, not guaranteed and sometimes leads to big errors when the multipath features of one location are similar to those of other locations. Furthermore, the teaching in this citation is meant for outdoor application, and a base-station is required for its implementation.

SUMMARY OF THE INVENTION

The present invention aims to provide a new and useful method for determining the position of an object.

The invention further proposes a new and useful system which determines its own position. The system may be an object of which it is desired to monitor the position. Or it may be an separate unit which is attached to the object in order that the position of the object can be determined.

In general terms, the present invention proposes that a positioning system transmits wireless (normally RF) signals in all directions (e.g. all directions within a horizontal plane, or all directions in a three-dimensional space) which are reflected by the surroundings. The system receives the echoes, but without measuring which direction they come from (in this sense the transmitter and receiver operate "omni-directionally"). During a training mode, the reflected signals are used to train an adaptive system, such as a set of transformation learning (TL) units which is preferably a set of neural networks, to map the varying position of the system to the characteristics of the reflected signals. During a working mode, the trained neural network is to identify the position of the system based on reflected signals.

In a first aspect, the invention proposes a system comprising:
  a transmitter for transmitting wireless signals in all directions within a range of directions, the range of directions including at least all directions in a plane;
  a receiver for receiving echoes of the wireless signals from any direction in the range;
  a processor for processing the received echoes to derive echo data signals indicative of the distance of the system to a plurality of reflective surfaces; and
  an adaptive system for:
  during a training stage, learning at least one association between the echo data signals and the position of the system based on training data composed of records of echo data signals and,associated system position data, and
  during a working stage, using the echo data signals and the learnt association to determine the position of the system.

In a second aspect, the invention proposes a method of determining the position of an object, the method comprising:
  transmitting wireless signals from the object in all directions within a range of directions which includes at least all directions in a plane;

receiving at the object echoes of the wireless signals from any of the range of directions;

processing the received echoes to derive echo data signals indicative of the distance of the object to a plurality of reflective surfaces;

during a training stage, learning at least one association between the echo data signals and the position of the object based on echo data signals and associated system position data, during a working stage, using the echo data signals and the learnt association to determine the position of the object.

In principle, certain adaptive systems are capable of learning any possible association between echo data signals and positions. However, in practice the reliability and robustness of the training and working is improved in preferred embodiments of the invention by selecting how the echo data signals are generated from the echoes.

Note that preferred embodiments of the invention operate without using "explicit references" as defined above. Instead, these embodiments of the invention operate as a "local positioning system" (also known in the literature as a "relative system") in which the position is established relative to a co-ordinate system which is defined by the user when generating the position data. This is in contrast to an "absolute" positioning system (such as GPS) in which the positions, typically of many objects, are defined relative to a co-ordinate system on which all users agree (i.e. as an "absolute" position). Naturally, the user has the option of choosing the position data to coincide with some absolute co-ordinate system, but in general the present invention does not require him to do so, so that the co-ordinate system may actually be arbitrary.

For certain sorts of echoes, specifically echoes from reflective surfaces which are planar, there is a linear relationship between the position values of the object measured relative to a set of Cartesian axes and delays in the echoes relative to the transmitted signals. Thus, if the echo data signals are generated as a list of these delays, then they will be linearly related to the position of the object as measured by the Cartesian axes. It has been found that this linear property is desirable for improving the training and working stages.

For other sorts of echoes, specifically echoes from reflective surfaces which are non-planar, no such linear relationship exists. In this cases, however, optionally embodiments of the invention may include a step of processing the echo signals to derive echo data signals including numerical values which are linearly related to the position values of the object measured by Cartesian axes.

For example, if the reflective surfaces occupy only a relatively small angular range around the object, they may reflect like point reflectors. For example, a small piece of metal may cause such a reflection, or a larger object which is at a greater distance. In this case, as discussed below, the echo signals from multiple such reflectors can be used to generate echo data signals including numbers having a linear relation to the position values of the object measured by Cartesian axes.

BRIEF DIRECTION OF THE FIGURES

Preferred features of the invention will now be described, for the sake of illustration only, with reference to the following figures in which:

FIG. 1, which is composed of FIGS. 1(*a*) and 1(*b*), illustrates a system which is an embodiment of the invention, and a situation in which the system may be used in a method according to the invention;

FIG. 2, which is composed of FIGS. 2(*a*) and 2(*b*), illustrates a simplified version of the situation of FIG. 1(*b*) and the theory underlying it;

Figure 6:
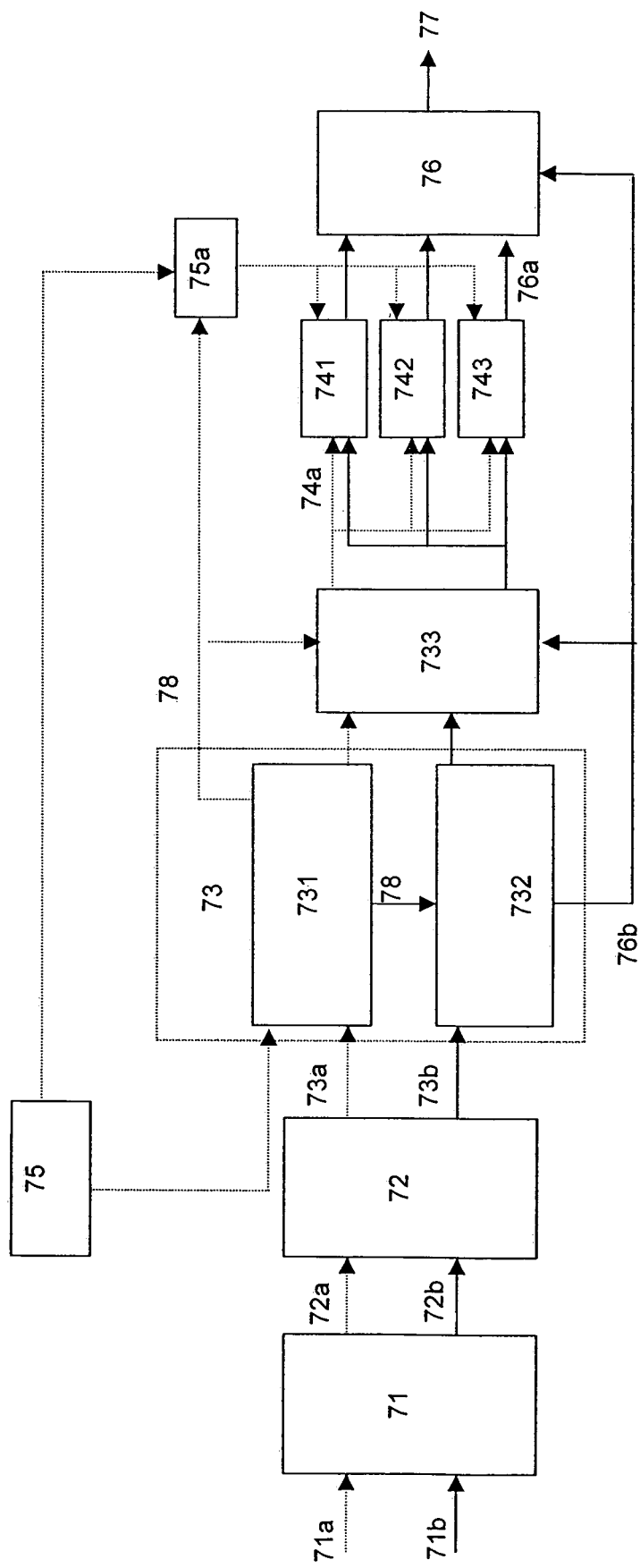
Figure 8A:
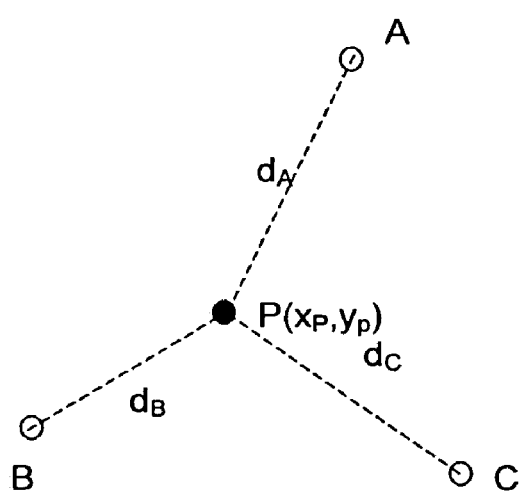
Figure 8B:
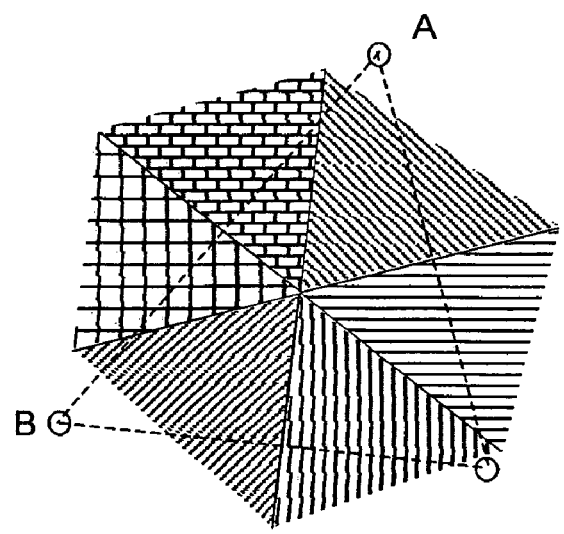
Figure 9:
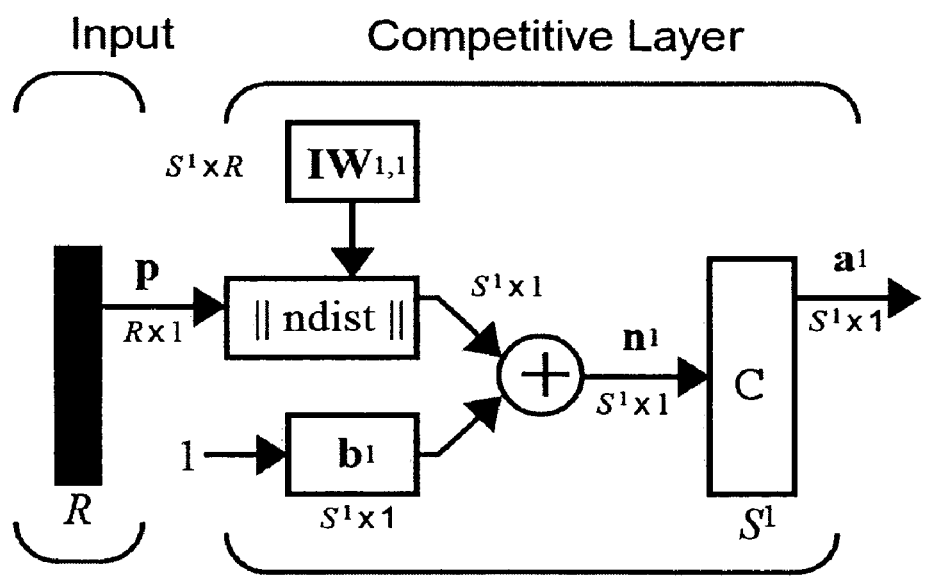
Figure 10:
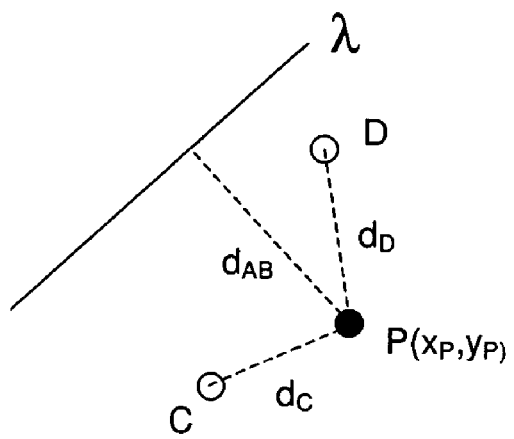
Figure 10:
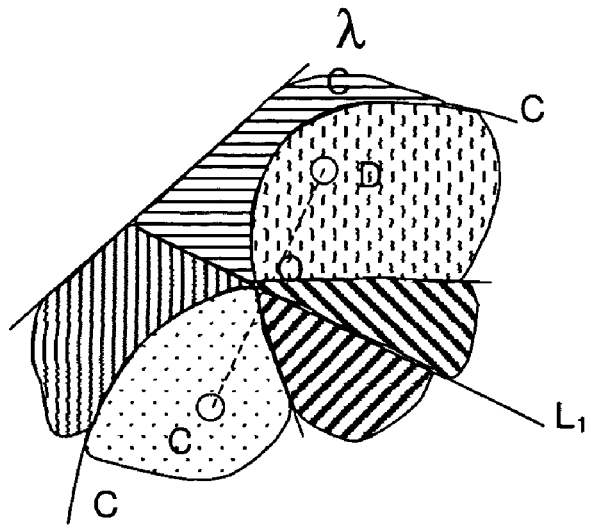
Figure 11:
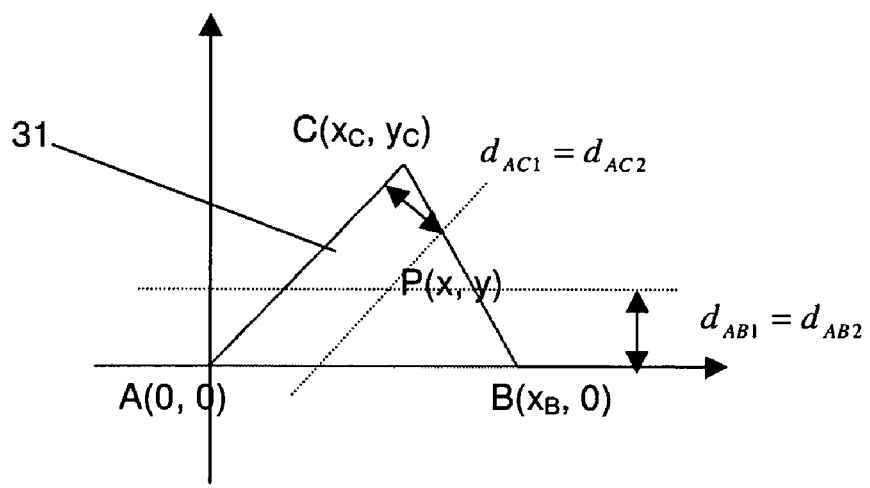
Figure 12:
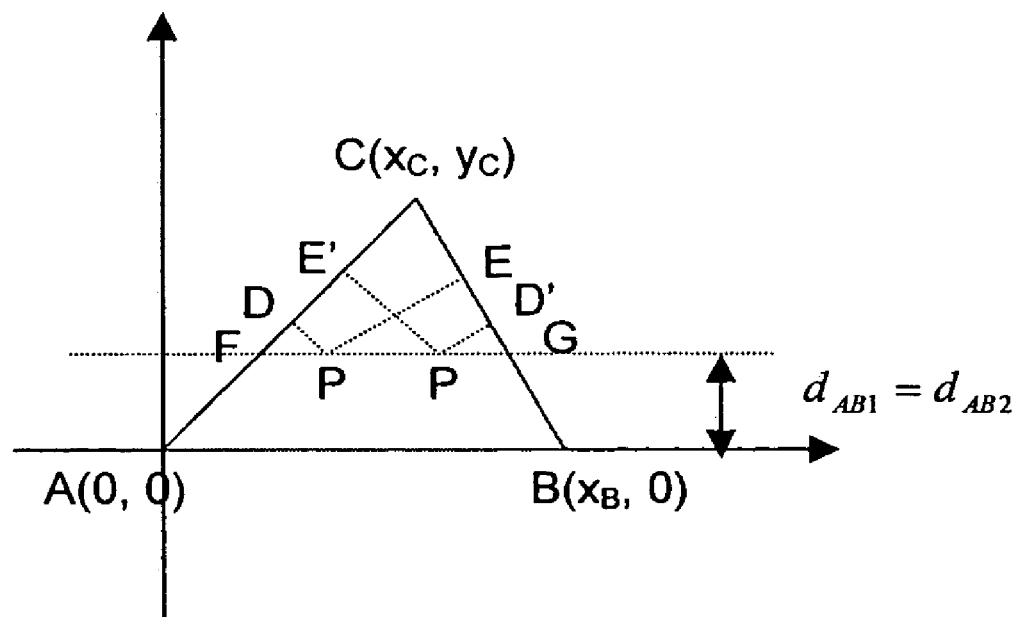
Figure 13:
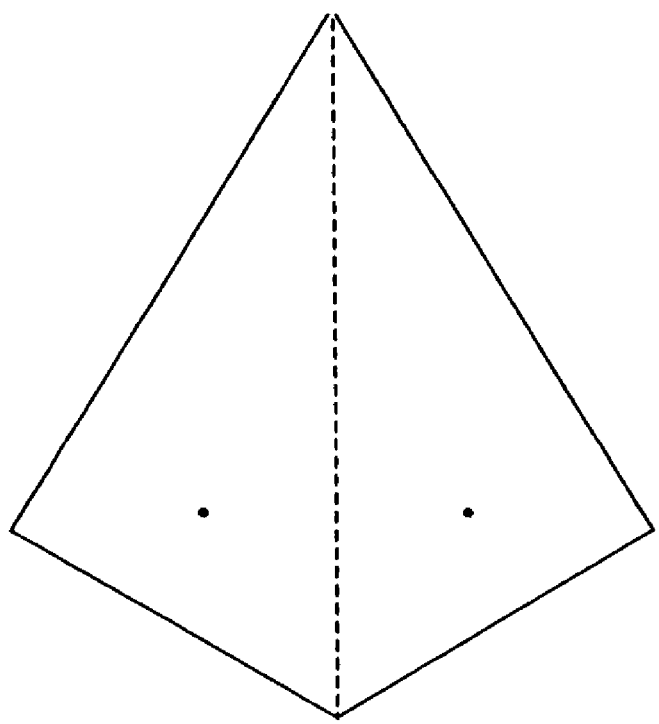
Figure 14:
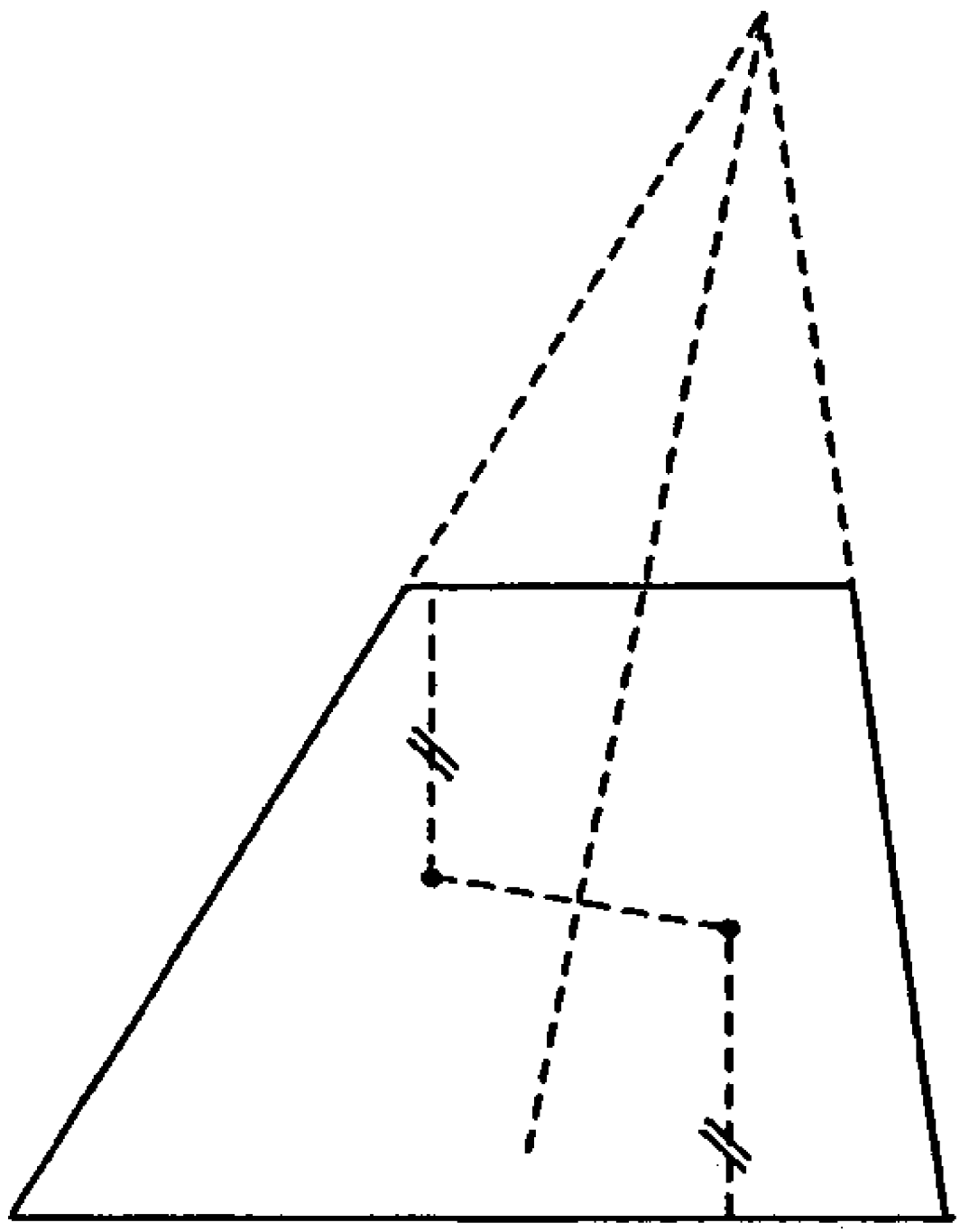
Figure 15:
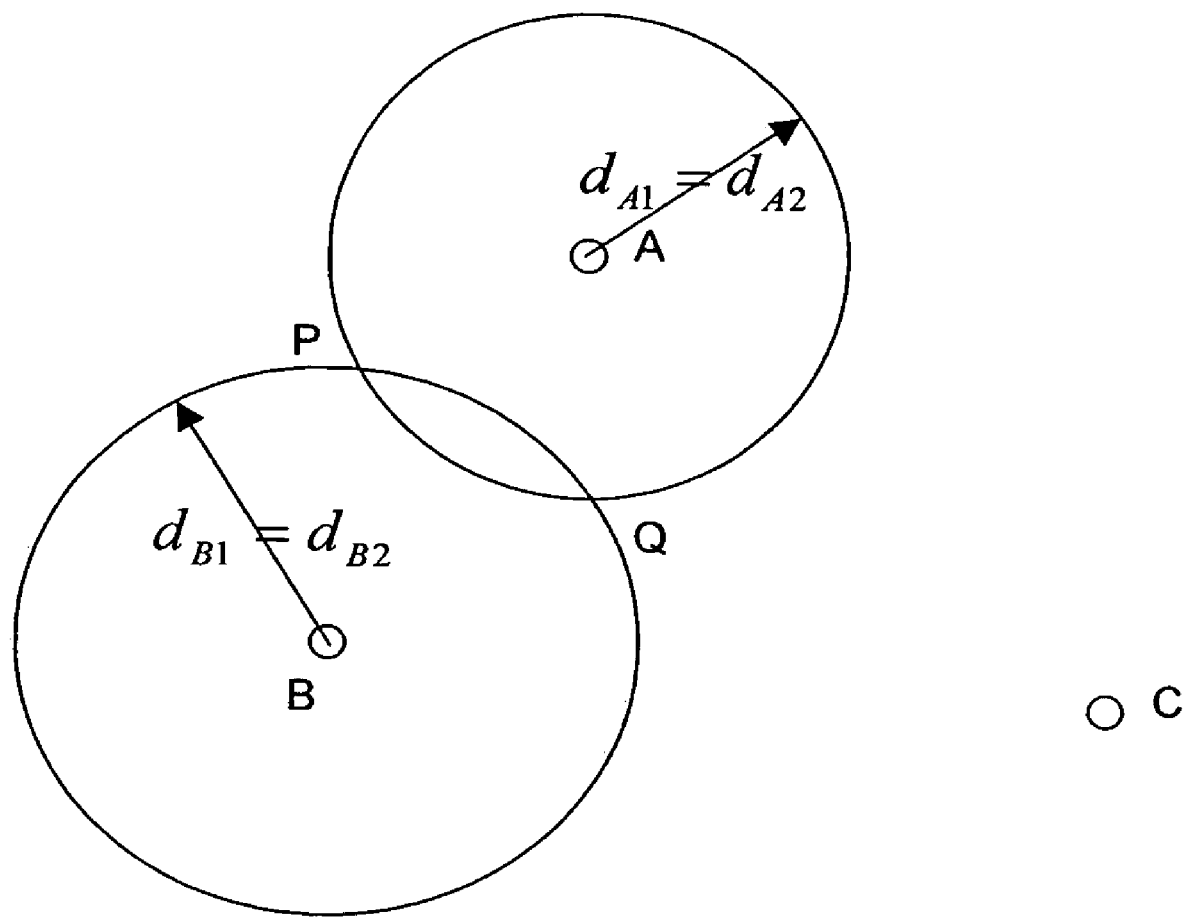

FIG. 5, which is composed of FIGS. 5(*a*) to 5(*d*), shows clustering techniques which may be used in the system of FIG. 1;

FIG. 6 is a block diagram of a third version of a signal processing unit of the system of FIG. 1;

FIG. 7, which is composed of FIGS. 7(*a*) to 7(*c*), illustrates problems encountered in certain applications of the system of FIG. 1(*a*);

FIG. 8, which is composed of FIG. 8(*a*) and FIG. 8(*b*), illustrates a problem addressed by a further embodiment of the invention;

FIG. 9 shows the architecture of a neural network employed in the embodiment of FIG. 8;

FIG. 10, which is composed of FIG. 10(*a*) and FIG. 10(*b*) illustrates a problem addressed by a further embodiment of the invention;

FIG. 11 illustrates a step of a proof contained in Appendix I;

FIG. 12 illustrates another step of the proof contained in Appendix I;

FIG. 13 illustrates a limitation in the applications of a system as shown in FIG. 1(*a*) in an environment which has symmetry in its shape;

FIG. 14 illustrates a,limitation in the applications of a system as shown in FIG. 1(*b*) in an environment which has parallel sides;

FIG. 15 illustrates a first case of a proof considered in Appendix II; and

Figure 16:
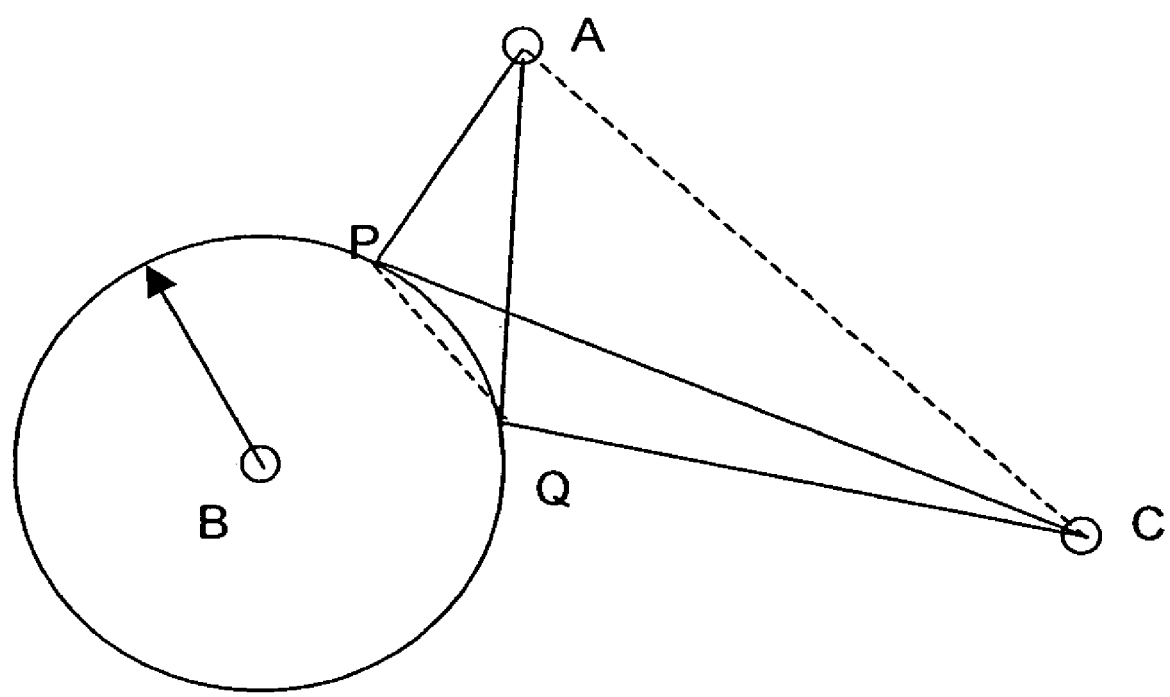

FIG. 16 illustrates a second case of a proof contained in Appendix II.

DETAILED DESCRIPTION OF THE EMBODIMENTS

FIG. 1(*a*) is a block diagram illustrating an embodiment of the invention which comprises a wireless transceiver 11 and a signal-processing unit 12. The transceiver 11 transmits short pulses, typically RF waves, via an omni-directional antenna 16, and receives reflected signals (echoes) from the surroundings.

The function of the transceiver 11 is to repeatedly transmit a short pulse and then receive and digitise the echoes. The digitised echoes are then fed as inputs to the signal processing unit 12.

The antenna 16 is preferably an omni-directional antenna, which is easier to design than a directional antenna, especially for high bandwidth RF signals. Besides the antenna 16, the transceiver 11 may also include a duplexer, a pulse generation unit 111, a timing control unit 112 and an A/D converter 113. The signal processing unit 12 can be integrated to the transceiver 11, or it can be remotely stationed. The processed result may be transmitted wirelessly to other processing devices via the wireless transmitter 11.

FIG. 1(*b*) shows how the embodiment 15 of FIG. 1(*a*) is used in an environment which is a two-dimensional space defined by a polygon 13. The polygon 13 in FIG. 1(*b*) may for example be the floor plan of an office in which the system 15 is located. AB, BC,CD, DE and EA stand for the walls of the office. The area 14 (which is shown as a rectangle, but may be any other shape) illustrates a working area within which a user moves the system 15 (it could be of any shape). The system 15 attempts to identify its position within the working space 14 by the antenna 16 transmitting signals and detecting and identifying the number of echoes from the sides of the polygon 13. By analysing the received echoes, the system outputs the calculated positions of the transceiver in real time 121.

Note that this situation makes the following assumptions:

Only reflections from planar reflectors (such as walls and large items of furniture) are considered. It is assumed that reflections from point sources either do not exist or can be filtered out since their magnitude is much smaller than those from planar reflectors.

Only direct echoes are considered. Echoes arising from multiple reflections of the signal are filtered out before the processing, using the fact that their amplitude is much smaller than those of the direct echoes.

Only specular reflection is included. Specular reflection is the strongest component in a diffuse reflection, and other components are filtered out before further processing.

Before considering this general case, we will consider a simplified version of the problem illustrated in FIG. 2(a). In this version, the polygon 13 is replaced by a triangle in a two-dimensional space defined by co-ordinates x, y. The triangle has corners A at position (0,0), B at position $(x_B,0)$, and C at position $(x_C, y_C)$. The distances $d_{AB}$, $d_{AC}$ and $d_{BC}$, from the point P(x,y) to the three sides of the triangle 31, are calculated from the TOFs (time of flight) of the reflected echoes (velocity of light×time-of-flight/2) to those sides. Note that the system does not know a priori which of the three echos it receives corresponds to which side of the triangle. A vector, $(d_1, d_2, d_3)$, referred to here as a "vector of distances", is formed by arranging the three distance values in ascending order, such that $d_1 \leq d_2 \leq d_3$.

It can be proven (see Appendix I below) that provided the triangle 31 is not an isosceles triangle, there is a one-to-one mapping between the vector of distances and a corresponding position in the triangle ABC. The mapping is in fact linear within each of the six sectors of the triangle ABC indicated by hashing in FIG. 2(b), where point O is the "inner centre" of the triangle, i.e. the intersection of the lines which bisect each angle. In other words, in the three dimensional space $(d_1, d_2, d_3)$, each of the six sectors corresponds to a different plane within the space. Each point in a given sector has a one-to-one mapping with a given point on the respective plane. In fact, these planes can be written as $I_1 d_i + I_2 d_j + I_3 d_k = 2$(Area of the triangle), where $I_1$, $I_2$ and $I_3$ are the respective lengths of the sides of the triangle, and $d_i$, $d_j$ and $d_k$ are different permutations of $d_1$, $d_2$ and $d_3$ $(d_i, d_j, d_k)$ depending on which of the six sectors of FIG. 2(b) the point P is in. Therefore, the mapping (and its inverse) between the position of the system 14 and the vector of distances can be described by six linear functions.

Figure 1A:
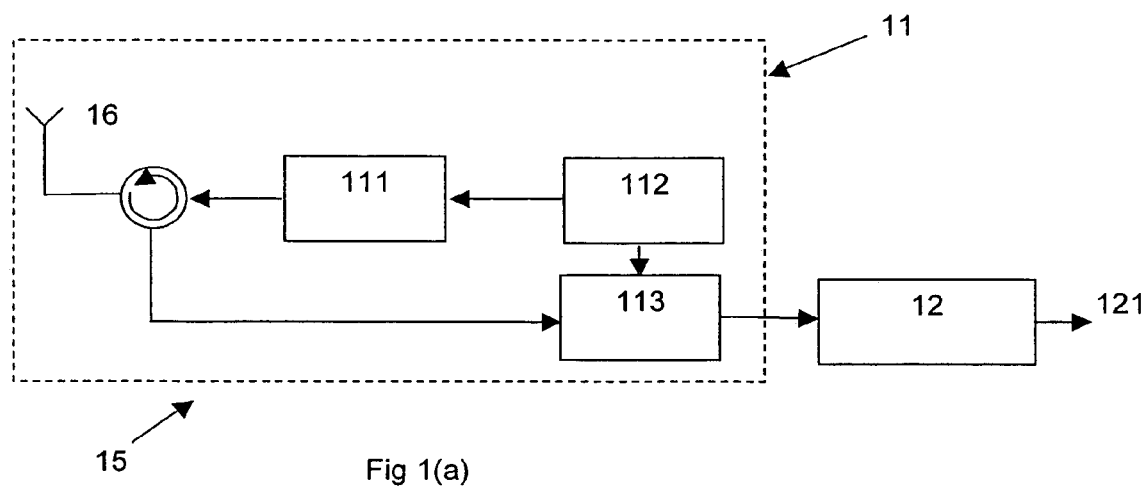
Figure 1B:
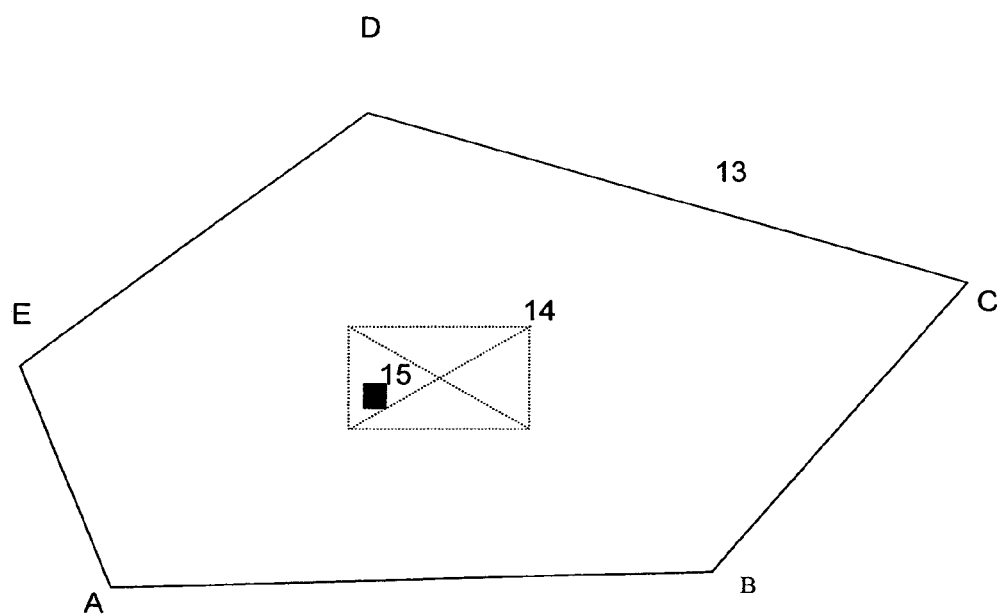

It will be appreciated that the concept of the vector of distances can be generalised from the triangular space of FIG. 2(a) to the general polygonal space of FIG. 1(b), and it will be demonstrated in Appendix I that the presence of a one-to-one mapping between this vector of distances and locations in the polygon holds true in general cases.

Methods which are embodiments of the invention include a training step in which training data is generated by locating the system 15 successively in different training positions $(x_i, y_i)$ by digitising reflected signals (the variable i labels the items of training data). The dotted lines 14 of FIG. 1(b) represent the working space within which the training positions are be arbitrarily chosen. Due to the phenomenon illustrated in FIG. 2(b) that the vector of distances shows discontinuous changes at the edges of sectors, the training data will tend to be clustered, such that (in the case of the environment of FIG. 2(a)) it is composed of points on the six planes in the (d1, d2, d3) space. The training data, i.e. pre-known coordinates $(x_i, y_i)$ and the digitised echoes received at these positions, is used to learn the mapping between the location of the system 15 and the vector of distances. Then there is a working step in which the system 15 is located in a unknown position $(x_t, y_t)$, and its position is determined using the vector of distances and the mapping.

Figure 3:
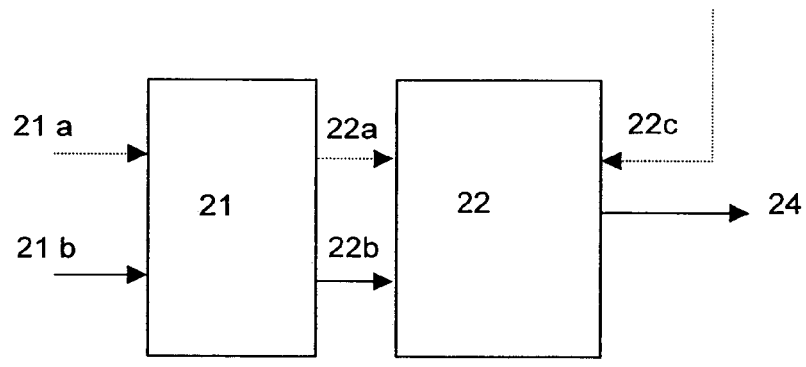
FIG. 3 is a block diagram of a first version of a signal processing unit of the system of FIG. 1.

FIG. 3 shows the construction of the signal processing unit 12 in a first version of the embodiment of FIG. 1. The training mode workflow is represented by dotted arrows and the working mode workflow is represented by solid arrows. The system 15 includes a switch (not shown) for switching between these two processing modes.

In the training mode, the reflected waveforms 21a received by the signal processing unit 12 are first pre-processed in a pre-processing unit 21. The unit 21 performs a pre-processing procedure comprising steps of sampling and digitising the received signals, averaging among signals of several emission-reception cycles to reduce noise, and optionally other steps (e.g. filtering) to further remove noise or distortions. The pre-processed waveforms 22a are then fed into a neural network 22. The training data also includes the 2D coordinates of each training point $(x_i, y_i)$, and these 2D coordinates 22c are also fed into the neural networks 22. The neural network coefficients of the neural network 22 are adjusted (using conventional neural network algorithms) to reduce the sum over the training points of an error function which measures the difference between the known positions $(x_i, y_i)$ and the output 24 of the neural network 22 when the waveforms 22a are input to the neural network 22.

When so trained, the system 15 in the working mode can determine its position $(x_t, y_t)$ based on echoes. Signals are again sent out by the system 15, and the reflections are again picked up and fed as signals 21b into the pre-processing unit 21. The pre-processed signal 22b is then fed into the neural network 22 which now determines the position $(x_t, y_t)$ of the transmitter based on the mapping and outputs a position signal 24.

Figure 4:
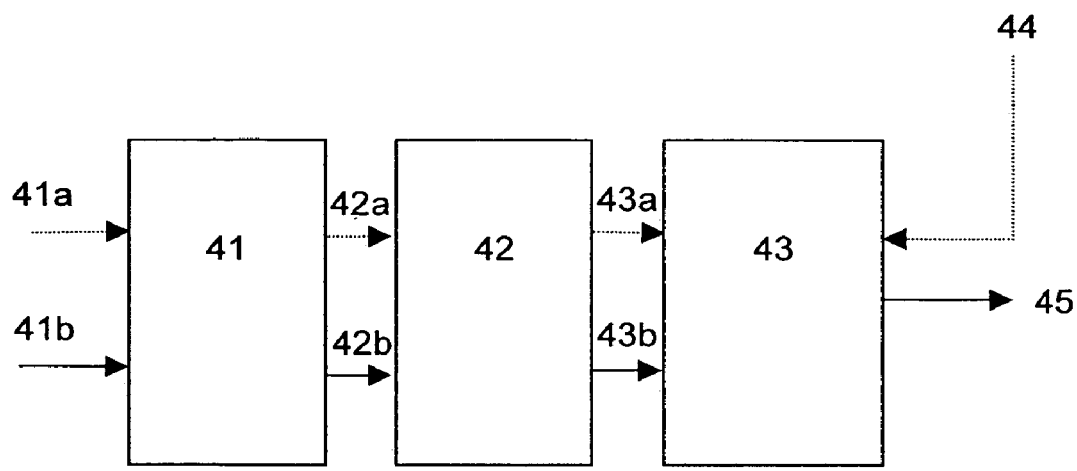
FIG. 4 is a block diagram of a second version of a signal processing unit of the system of FIG. 1.

The workflow of a second version of the signal processing unit 12 of the system of FIG. 1 is shown in FIG. 4. The training workflow is represented by the dotted arrows while the working workflow is represented by the solid arrows. During the training, as in the version of the signal processing unit 12 shown in FIG. 3, the reflected signals 41a are fed into the pre-processing unit 41 to remove noise and signal distortions. The signals 42a output by the unit 41 are then fed into a unit 42 to calculate vectors of distances 43a. The vectors of distances 43a are then fed into a neural network 43, along with the coordinates 44 of the present training point $(x_i, y_i)$. The neural network coefficients of the neural network 43 are adjusted (using conventional neural network algorithms) to reduce the sum over the training points of an error function which measures the difference between the known positions $(x_i, y_i)$ and the output 45 of the neural network 43 when the vectors 43a are input to the neural network 43.

In the working mode, the reflected signals 41b are pre-processed in the pre-processing unit 41. The resultant signals 42b are then fed into the unit 42 for calculating the vector of distances 43b, which are subsequently fed into the neural network 43 which determines the 2D position $(x_t, y_t)$ of the system as output 45.

The neural networks of the first and second variants are preferably multi-layer feed-forward (FF) or radial basis functions (RBF) networks.

Whereas the first and second variants of the signal processing do not take any account of the importance of the sectors illustrated in FIG. 2(b), a third variant of the signal processing unit 12 of FIG. 1 includes means for clustering the vectors of distances.

The clustering of the training data into six different planes can be done by a Hough transform (see Digital Image Processing, page 432-438, Rafael C. Gonzalez, Richard E. Woods and Addison Wesley, 1993). A Hough Transform is frequently used in image processing to link points by determining whether they lie on a curve of specified shape. This method transforms the description of the curve in the image space into the parameter space to reduce the computation load. The detailed procedure can be found in normal image processing textbooks. Experimentally, it has been found that a Hough Transform is able very accurately to classify vectors of distances obtained in a set-up as shown FIG. 2(a) into the 6 planes. The Hough Transformation method, however, may not converge if requires the surroundings are not closed polygons.

Other than by a Hough transform, the clustering may be done by self-organising networks. Self-organising networks detect regularities and correlations in the inputs and accordingly adapt responses.

There are two common structures of self-organising networks, competitive networks and self-organising maps. These techniques use entities referred to as "neurons", but these are not to be confused with the neurons used in the neural networks 22, 43 used in FIGS. 3 and 4. Competitive networks learn to recognise groups of similar input vectors. Self-organising maps learn to recognise groups of similar input vectors in such a way that neurons physically near each other in the neuron layer respond to similar input vectors. In both cases, the state of the networks are defined by "neural network coefficients".

In a first form of learning using self-organising maps, the neural network coefficients are adjusted to recognise groups of similar distance-location vectors. A "distance-location vector" is made up of the vector of distances concatenated with the vector of the location (i.e. the training positions $(x_i,y_i)$). This distance-location vector provides more information for the clustering of the training data.

Figure 5A:
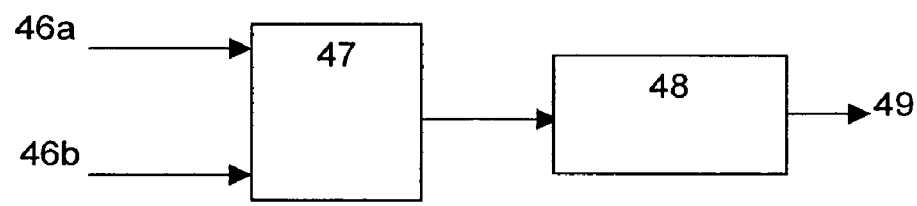

FIG. 5(a) illustrates a process of clustering based on distance-location vectors. Vectors of distances 46a are extracted from training data, and are fed into a unit 47 along with the corresponding vector of location 46b. The unit 47 concatenates the vectors of distances and the 2D coordinates into the distance-location vectors. The distance-location vectors are then fed into a self-organising network 48 which clusters the distance-location vectors into a pre-set number (N) of groups, based on the regularities in them. The output 49 of the unit 48 whenever a given distance-location vector is input to it, is a the number in the range 1 to N indicative of which group the vector of distances corresponds to.

Figure 2:
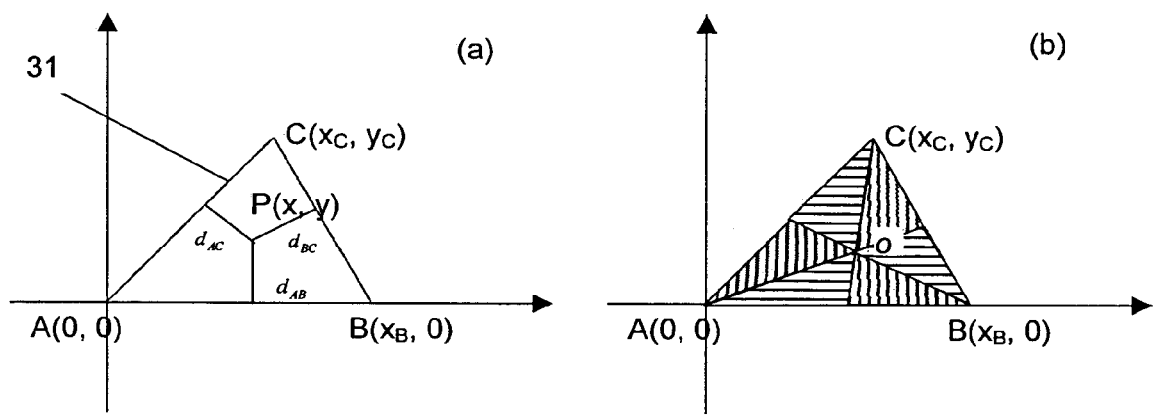

In a triangle such as that in FIG. 2, the self-organising networks 48 can cluster the input vectors into 6 groups corresponding to 6 sectors of the triangle divided by the bi-sectors. Unlike a clustering method using the Hough transform, this method does not require the surroundings to be a closed polygon in shape and can be applied to more general scenarios.

Figure 5B:
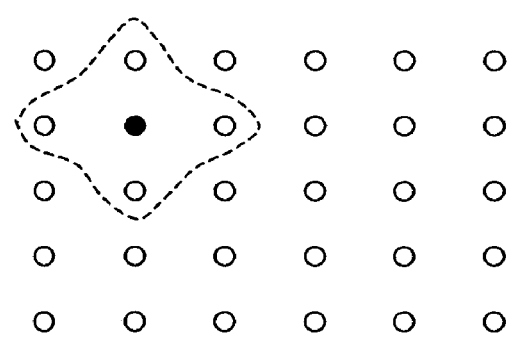
Figure 5C:
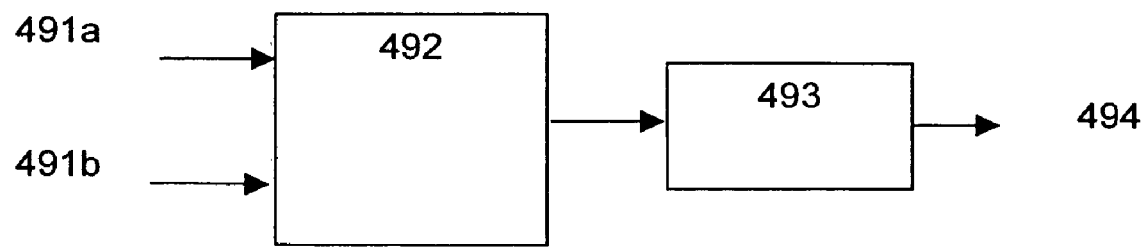

An alternative to clustering using the distance-location vectors is shown in FIG. 5(b) and FIG. 5(c). This method of clustering is based on an assumption that, within sections of an enclosed area, there is a linear transformation between the vector of distances and the 2D coordinates. By using at least 3 neighbouring training points, which do not lie on a same line, the linear transformation between the 2D coordinates of a position and a vector of distances of the position can be estimated. If these three neighbouring points happen to all lie in the same section in the enclosed area, the linear transformation for the section can be correctly estimated. The linear transformations between the distance vector and the 2D coordinates are estimated for every N neighbouring training points (the selection of the points affects the success of the estimations). The estimation of the linear transformation may be done by the least-square method. FIG. 5(b) shows a lattice-like group of training points where the distance vectors and the 2D coordinates of the darkened point and the 4 points nearest to it are used to estimate a linear transformation. This localised transformation is assigned to the point of interest, i.e. the darkened center point.

FIG. 5(c) is a block diagram of a clustering process based on locally estimated linear transformation. Vectors of distances 491a extracted from the training data are fed, together with location vectors 491b, into a unit 492 for working out the linear transformation. The resultant matrix is then Converted into a vector and then fed into a self-organising network 493, by which they are clustered into groups. The output 494 of the unit 493 whenever a given linear transformation is input to it is a the number in the range 1 to N indicative of which group the vector of distances corresponds to.

Conceivably, if the points shown in FIG. 5(b) do not all lie within a same section, i.e. they do not all belong to one cluster, so an inaccurate estimation of the linear transformation will result. However, if the training data is well distributed, such that there are many more correct estimations than inaccurate ones, the self-organising network 493 can be used to accurately cluster the linear transformations into a pre-set number of groups (six in the case of a triangle). This method does not have the disadvantage of requiring the surroundings to be closed-polygonal in shape, unlike the Hough transform.

As described above, the self-organising networks 48, 493 learn to output a signal indicative of a cluster whenever an appropriately processed portion of the training data (e.g. a distance-location vector or linear transformation) is input to them. The output of the self-organising networks is useful because it can train another unit, a "classifying unit", to recognise associations between the training data and these clusters.

Figure 5D:
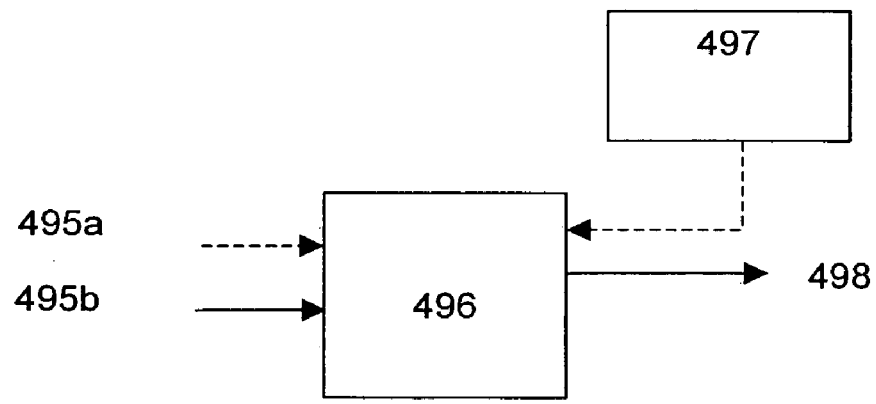

This process is shown in FIG. 5(d), in which, during the training phase, an adaptive model 496 known as an LVQ (learning vector quantization) network is taught to classify input vectors of distance 495a into the clusters derived by the clustering units of FIGS. 5(a) or 5(c). During the training phase, the LQV network 496 is simultaneously fed (as shown by the dotted lines) with the vectors of distance 495a and the corresponding indices 49, 494 obtained from the clustering units (these indices are shown as 497 in FIG. 5(d)).

During the working phase, the unit 496 is receives only the vectors of distances (shown by a solid arrow), and operates based only on them to identify the group, and outputting the number 498 in the range 1 to N indicative of which group the vector of distances corresponds to. Again, this method does not require the surrounding to be a closed polygon.

Referring now to FIG. 6, a third variant of the signal processing unit 12 of FIG. 1 is shown. The work flow in the training mode is shown in dotted arrows and the work flow in the working mode is shown in solid arrows. Again, in the training mode, signals are transmitted to the surroundings by the system 15 and signals reflected by planar surfaces are received by the transceiver 11 of the system 15. The output 71a of the transceiver is fed into a pre-processing unit 71 to remove noise and signal distortions. The filtered signals 72a are then fed into a unit 72 to calculate the vector of distances, and the output 73*a* is fed into a clustering/classifying unit 73 to be clustered into planes. The clustering/classifying unit 73 may employ the Hough Transformation. Alternatively, it may include a clustering unit 731 such as shown in FIG. 5(*a*) or 5(*c*) (implementing a clustering algorithm, such as those described above) and a classification unit 732 (as shown in FIG. 5(*d*)). As mentioned above, the clustering unit 731 during the learning phase receives both the location data (from database 75) and the vector of distances, and it outputs an index representing a cluster. This is used during the training phase to train the clustering unit 732 to recognise clusters based on vectors of distances only. During the working phase, the clustering unit 732 is not used, and the classification unit recognises vectors of distances without any input from the clustering unit 731.

The system further includes a number of neural networks 741, 742, 743. Note that the neural networks 741, 742, 743 may be replaced by any other form of adaptive transformation unit (an example is given below). Furthermore, although three neural networks are shown, the number is not limited to three (and is in general many more). According to the number of clusters which the clustering unit 731 identifies, an equal number of the TL learning units are activated and one TL learning unit is associated with each respective cluster.

In the training mode, the output 78 of the clustering unit 731 is also fed to two selection units 75*a* and 733. The selection unit 733 passes the vector of distances (which it receives from the classification unit 731) to the one of the TL units 741, 742, 743 identified by the signal 78. Simultaneously, the selection unit 75*a* passes the corresponding location data ($x_i$, $y_i$) from the database 75 to the TL unit identified by the signal 78. The coefficients of that TL unit are adjusted (using conventional algorithms) to reduce the sum over the training points of an error function which measures the difference between the known positions ($x_i$, $y_i$) and the output 76*a* of that TL unit when the signal 74*a* is input to the TL unit.

In the working mode, reflected signals 71*b* are firstly fed into the pre-processing unit 71. The filtered signal 72*b* is then fed into the unit 72 to obtain the vector of distances. Next, the vector of distances is fed into the clustering/classifying unit 73 and is classified as belonging to one of the clusters, by the classification unit 732 which outputs a result 76*b*. The selection unit 733 feds the vector of distances 74*a* (which it obtained from the classification unit 732) to the TL unit 741, 742, 743 . . . identified by the signal 76*b*. The unit 76 receives the outputs of all the TL units and the signal 76*b* indicating which cluster the vector of distances belongs to. The unit 76 outputs a signal 77 which is the output of the TL unit associated with that cluster.

In the case that the TL units 741, 742, 743 are neural networks, they may be very simple: preferably simple 2-neuron linear feed-forward structures (i.e. a two layer structure having an input layer and an output layer, with no hidden layer). This is simply because the distance from a point to a line is a linear function of x-y coordinates. For example, in the configuration of FIG. 2(*a*), the distances to AB, BC and AC are:

$$d_{AB} = y$$

$$d_{BC} = \frac{(y_C x - (x_C - x_B)y - x_B y_C)}{\sqrt{y_C^2 + (x_C - x_B)^2}}$$

$$d_{AC} = \frac{(y_C x - x_C y)}{\sqrt{x_C^2 + y_C^2}}$$

Note that many variants of the system of FIG. 6 are possible within the scope of the invention. In particular, as mentioned above, the TL units need not be neural networks, but may instead be units which perform a least squares estimation of linear transformation 741, 742, 743. The transformation between the vectors of distances and the 2D coordinates obtained by estimation based on least squares is represented mathematically below. If the mapping between the vectors of distances and the 2D coordinates for one of the clustered training points is written as (for one point with sub-index i):

$$\begin{bmatrix} d_{1i} \\ d_{2i} \\ \ldots \\ d_{Ni} \end{bmatrix} = A \begin{bmatrix} x_i \\ y_i \\ 1 \end{bmatrix} \quad (1)$$

Then for all the training data with sub-index i=1 to M within this same cluster:

$$\begin{bmatrix} d_{11} & d_{12} & \ldots & d_{1M} \\ d_{21} & d_{22} & \ldots & d_{2M} \\ \vdots & \vdots & \ddots & \vdots \\ d_{N1} & d_{N2} & \ldots & d_{NM} \end{bmatrix} = A \begin{bmatrix} x_1 & x_2 & \ldots & x_M \\ y_1 & y_2 & \ldots & y_M \\ 1 & 1 & \ldots & 1 \end{bmatrix} \quad (2)$$

As long as M≧3 and not all the points fall on one straight line, the transformation matrix A can be estimated in least-square sense as:

$$A = D \cdot \text{pseudo-inverse}(X) \quad (3)$$

where $$D = \begin{bmatrix} d_{11} & d_{12} & \ldots & d_{1M} \\ d_{21} & d_{22} & \ldots & d_{2M} \\ \vdots & \vdots & \ddots & \vdots \\ d_{N1} & d_{N2} & \ldots & d_{NM} \end{bmatrix} \text{ and } X = \begin{bmatrix} x_1 & x_2 & \ldots & x_M \\ y_1 & y_2 & \ldots & y_M \\ 1 & 1 & \ldots & 1 \end{bmatrix}$$

The various embodiments of the invention have been described above with reference to the situation of FIG. 2, but their implementation in the situation of FIG. 1(*b*) is straightforward. Although the input from a polygonal environment to the neural networks will comprise more than three elements making up a vector of distances, e.g. ($d_1, d_2, d_3 \ldots d_N$), the clustering will then be to find 2D planes in the N-dimensional space of distances. The Hough Transform is still applicable. If the number of sides in the environment is unknown, a pre-set number of planes can be assumed. The structure of the neural network remains the same simple 2-neuron linear feed-forward structure. Furthermore, the situations of FIG. 1(*b*) and FIG. 2(*a*) are two-dimensional. However, the embodiments are readily extended to real life, 3D situations, since the distance from a point ($x_P, y_P, z_P$) to a plane Ax+By+Cz+D=0 is $$\frac{|Ax_P + By_P + Cz_P + D|}{\sqrt{A^2 + B^2 + C^2}},$$

which is again linear. The linear mapping will be the same within 3D sections divided by the bisector planes in 3D spaces. The clustering step will then be to find a 3D "hyper plane" within a space of at least 4 dimensions (the Hough Transform method is also applicable in 3D space). The neural networks, however, will have 3 neurons instead of 2.

Note that the embodiments above do have some limitations. For example, considering the environment shown in FIG. 7(a) which is an obtuse triangle, there may be locations where not every element in a vector of distances can be measured, because the direct specular reflections from one of the sides cannot be received. FIG. 7(b) is a graph of the intensity of the received signal against time when the system 15 is in one of the shaded areas of FIG. 7(a), and contains only two peaks. For this reason, the embodiments do not work within the shaded areas of the obtuse triangle in FIG. 7(a) because the one-to-one mapping pre-requisite is not valid. In those regions, any pair of points that are symmetric to the bisector of $\angle A$ or $\angle B$ give the same vector of distances. However, this will not influence the validity of the method within the un-shaded area of the triangle where reflections from all three sides of the triangle can be obtained. This situation also can be generalised to a more complex space defined by more than three sides. Whether the work area 14 chosen by the user of the system is workable or not can be found out by looking for changes in the number of echoes during the training session.

It was noted above that the one-to-one mapping property for the environment of FIG. 2(a) is only valid if the triangle is not an isosceles triangle. More generally, if the surroundings of the system 15 are a polygon with more than three sides (as in FIG. 1(b)), the one-to-one property of the mapping remains true only if there is no symmetry in the polygon (an example of a symmetrical polygon is an equilateral pentagon), for example if it has no parallel sides like a rectangle. However, even in these cases, within a certain sub-area, this one-to-one mapping property may still be valid.

For example, referring to the rectangular area shown in FIG. 7(c), within any one of the eight small triangles defined by the dashed lines the one-to-one property still holds and the present embodiment can be applied.

Finally, although it is theoretically proven that any one-to-one mapping can be, learnt by a neural network (e.g. RBF) to high levels of accuracy, given a large enough number of neurons and training data, in reality there is always a limit on the complexity of the neural network and the acceptable amount of training data. These factors may limit the performance of the embodiment of FIG. 5, but the embodiment of FIG. 6 is more resistant to this problem.

As noted above, FIG. 1(b) shows how the embodiment of FIG. 1(a) is used in a situation in which the environment is defined by a polygon. However, the uses of the embodiment of FIG. 1(a) are not limited to such an environment. In certain environments, reflective surfaces exist which may be treated as point source reflectors. Such reflective surfaces may include a small piece of metal material (e.g. having a reflective surface for which the average radius of curvature is smaller than the tolerance in resolving the distance to the object). Alternatively, it may include an object which may have a substantially flat reflective surface but which is in the far distance. In certain situations, such reflective surfaces contribute significant power in the echoes. Although, as suggested above, echoes from these reflective surfaces may optionally be ignored (e.g. filtered out), other versions of the embodiment of FIG. 1 may include a signal processing unit 12 which is arranged to employ such reflections. The unit 12 may be configured to operate only one reflections from reflective surfaces which are effectively point reflectors, or to operate on any combination of such echoes with echoes from planar surfaces.

Initially, we will consider the first of these possibilities: in which all the echo signals analysed by the signal processing unit 12 are from point-like reflective surfaces.

This situation is not handled in the same way as planar reflectors because, if we write the position in the x- and y-plane of a tranceiver as $(x_{Tx/Rx}, y_{Tx/Rx})$ and the position of the point-like reflector as $(x_{ref-P}, y_{ref-P})$, then the distance from point-like reflector to the transceiver (Tx/Rx) is different and non-linear in nature. Specifically, it is given by the equation:

$$d=\sqrt{(x_{Tx/Rx}-x_{ref-P})^2+(y_{Tx/Rx}-y_{ref-P})^2}$$

Although in principle a neural network can learn such a non-linear relationship, this is harder.

However, if there are two point source reflectors, at respective positions $(x_{ref-P1}, y_{ref-P1})$ and $(x_{ref-P2}, y_{ref-P2})$, we can formulate a linear relationship between the respective distances $d_1$, $d_2$ of these point-like reflectors to the transceiver, by squaring the two distance equations and subtracting one from the other, as:

$$(d_1^2-d_2^2)=2(x_{ref-P2}-x_{ref-P1})x_{Tx/Rx}+2(y_{ref-P2}-y_{ref-P1})y_{Tx/Rx}+(x_{ref-P1}^2+y_{ref-P1}^2-x_{ref-P2}^2-y_{ref-P1}^2)$$

Similarly, if there are no less than three point source reflectors at different locations, two independent linear equations can be formed relating the 2D co-ordinates $(x_{Tx/Rx}, y_{Tx/Rx})$ with distance information which can be extracted from the echo signals from the three reflectors. With these two equations, the 2D co-ordinates $(x_{Tx/Rx}, y_{Tx/Rx})$ can be uniquely and easily calculated. So, in a very similar way to the embodiments discussed previously, the position $(x_{Tx/Rx}, y_{Tx/Rx})$ can be calculated by analyzing the echo signals, once the linear transformations have been learnt from training data.

As in the case of analysing reflections from planar reflective surfaces, first we examine the uniqueness of the mapping between the distance vector and the transceiver's position. This is a different geometrical problem from the previous case and a discussion of it is given in Appendix II. Secondly, the mapping between the distance vector and the values $(x_{Tx/Rx}, y_{Tx/Rx})$ must be examined closely, in order to formulate practical algorithms.

To start with, we still study the triangle case, with three point sources residing at the three vertices. FIG. 8, which is composed of FIGS. 8(a) and 8(b), demonstrates the problem. FIG. 8(a) shows the distances from the three vertices, $d_A$, $d_B$ and $d_C$ respectively. Writing the position of the transceiver now as $(x_p, y_p)$ and the positions of the three vertices respectively as $(x_A, y_A)$, $(x_B, y_B)$ and $(x_C, y_C)$, the three distances can be written as:

$$d_A=\sqrt{(x_P-x_A)^2+(y_P-y_A)^2} \quad (4)$$

$$d_B=\sqrt{(x_P-x_B)^2+(y_P-y_B)^2} \quad (5)$$

$$d_C=\sqrt{(x_P-x_C)^2+(y_P-y_C)^2} \quad (6)$$

Using the formulation introduced before, from $(4)^2-(5)^2$ and $(4)^2-(6)^2$ we have:

$$\begin{cases} d_A^2-d_B^2 = 2(x_B-x_A)x_P+2(y_B-y_A)y_P+(x_A^2+y_A^2-x_B^2-y_B^2) \\ d_A^2-d_C^2 = 2(x_C-x_A)x_P+2(y_C-y_A)y_P+(x_A^2+y_A^2-x_C^2-y_C^2) \end{cases} \quad (7)$$

(7) is actually a one-to-one linear transformation between a function of the distance information and the 2D coordinates of Tx/Rx position.

On the other hand, the distance vector (a permutation of $d_A$, $d_B$ and $d_C$) extracted from the echoes is defined as:

$$(d_1, d_2, d_3) = (\min(d_A, d_B, d_C), \mathrm{mid}(d_A, d_B, d_C), \max(d_A, d_B, d_C)) \quad (8)$$

and we can have following formulation:

$$\begin{bmatrix} d_1^2 - d_2^2 \\ d_1^2 - d_3^2 \end{bmatrix} = A_{2\times 3} \begin{bmatrix} x_P \\ y_P \\ 1 \end{bmatrix} \quad (9)$$

which is actually linear but with different values of $A_{2\times 3}$ at different areas illustrated in FIG. 8(b). The areas are divided by perpendicular bisectors of each side and O is the so-called "circumcenter". In each of these area, the distance vector will be a different permutation of $d_A$, $d_B$ and $d_C$, thus the value of $A_{2\times 3}$ is different. This property of "clustered linearity" is quite similar to what we observed in the planar reflector case.

As in the planar reflector case, if these different linear transformations and the way of clustering the received echoes into one of the six different areas can be learned, the 2D coordinate can be calculated from the echoes readily. In the applications of the embodiment described above, the clustering of training data and classifying of received echoes into one of the clusters is done by Hough Transform based on the observation of a linear separable relationship in $d_1$-$d_2$-$d_3$ space. However, this technique is not valid here.

However, for the clustering part of the task, the embodiment utilizes self organizing neural networks based on estimated linear transformations, as in the planar reflector case. With at least a group of three points in the training data that does not lie on one line, a local estimation of $A_{2\times 3}$ can be estimated and the clustering of training data can be directly based on these estimations. There is another clue that can be used in the clustering to make it more accurate and robust. If we look closely at the 6 different values of $A_{2\times 3}$ which in total have 36 elements, actually only 9 of them are really independent. This can be seen by examining the elements of all 6 matrices that are listed below.

$$\begin{bmatrix} 2(x_B - x_A) & 2(y_B - y_A) & (x_A^2 + y_A^2 - x_B^2 - y_B^2) \\ 2(x_C - x_A) & 2(y_C - y_A) & (x_A^2 + y_A^2 - x_C^2 - y_C^2) \end{bmatrix} \text{ where } (d_A \le d_B \le d_C)$$

$$\begin{bmatrix} 2(x_C - x_A) & 2(y_C - y_A) & (x_A^2 + y_A^2 - x_C^2 - y_C^2) \\ 2(x_B - x_A) & 2(y_B - y_A) & (x_A^2 + y_A^2 - x_B^2 - y_B^2) \end{bmatrix} \text{ where } (d_A \le d_C \le d_B)$$

$$\begin{bmatrix} 2(x_A - x_B) & 2(y_A - y_B) & (x_B^2 + y_B^2 - x_A^2 - y_A^2) \\ 2(x_C - x_B) & 2(y_C - y_B) & (x_B^2 + y_B^2 - x_C^2 - y_C^2) \end{bmatrix} \text{ where } (d_B \le d_A \le d_C)$$

$$\begin{bmatrix} 2(x_C - x_B) & 2(y_C - y_B) & (x_B^2 + y_B^2 - x_C^2 - y_C^2) \\ 2(x_A - x_B) & 2(y_A - y_B) & (x_A^2 + y_A^2 - x_A^2 - y_A^2) \end{bmatrix} \text{ where } (d_B \le d_C \le d_A)$$

$$\begin{bmatrix} 2(x_A - x_C) & 2(y_A - y_C) & (x_C^2 + y_C^2 - x_A^2 - y_A^2) \\ 2(x_B - x_C) & 2(y_B - y_C) & (x_C^2 + y_C^2 - x_B^2 - y_B^2) \end{bmatrix} \text{ where } (d_C \le d_A \le d_B)$$

$$\begin{bmatrix} 2(x_B - x_C) & 2(y_B - y_C) & (x_C^2 + y_C^2 - x_B^2 - y_B^2) \\ 2(x_A - x_C) & 2(y_A - y_C) & (x_C^2 + y_C^2 - x_A^2 - y_A^2) \end{bmatrix} \text{ where } (d_C \le d_B \le d_A)$$

FIG. 9 illustrates one typical structure which may-be used in the embodiment as a possible implementation (a "competitive network") of the element 493 in FIG. 5(c). It is a variety of self-organising neural network which is well known in the literature of adaptive systems. The box ||dist|| in FIG. 9 receives an input vector p and the input weight matrix IWI,I, and produces a vector having $S^I$ elements. The elements are the negative of the distances between the input vector and the vectors IWI,I formed from the rows of the input weight matrix. The net input nI of a competitive layer in computer by finding the negative distance between input vector p and the weight vectors and adding the biases b. If all biases are zero, the maximum net input a neuron can have is 0. This occurs when the input vector p equals that neuron's weight vector. The competitive transfer function accepts a net input vector for a layer and returns neuron outputs of 0 for all neurons except the "winner", i.e. the neuron associated with the most positive element of net input nI. The winner's output is I. If all biases are 0, then the neuron whose weight vector is closes to the input vector has the least negative net input, and therefore wins the competition to output a I. Based on the equations given above, in the training of self-organizing neural networks some of the elements of the input weight matrix IWI,I can be forced to be equal to another one. This method is proved to be very successful in simulations.

Using self-organization based on estimated linear transformations has another advantage that optionally at the same time of clustering, the corresponding linear transformation for each cluster may be estimated. This is because the working principle of the self-organising network is such that after training the vectors formed from the rows of the input weight matrix IWI,I will be the "average" of those inputs of one cluster. In this method, the input vectors are the estimated linear transformations, so that the result IWI,I after training will contain the six linear transformations we want to estimate. Thus, optionally, the vectors formed from the rows of the result input weight matrix IWI,I can be re-arranged into matrix form and used to replace the results of the TL units(e.g. the units 741, 742, 743 of FIG. 6), making those units unnecessary. However, the embodiment is not limited to this possibility, and in other realisations of the embodiment clustering and transformation learning are treated as two different functions which may be done by different methods.

For the classifying, another metric is used. In (9), actually the information of three distances was not fully utilized since only two equations are included. We can actually take the advantage of the third one in the clustering as:

$$d_I^2 = (x_P - x_I)^2 + (y_P - y_I)^2 \quad (10)$$

where I can be A, or B, or C depending on which area the transceiver is within. Together with (9), we can further get:

$$d_1^2 = B_{1\times 6} \begin{bmatrix} (d_1^2 - d_2^2)^2 \\ (d_1^2 - d_3^2)^2 \\ (d_1^2 - d_2^2)(d_1^2 - d_3^2) \\ (d_1^2 - d_2^2) \\ (d_1^2 - d_3^2) \\ 1 \end{bmatrix} \quad (11)$$

This is because from (9) we know that the 2D coordinate $(x_P, y_P)$ can be formulated as a linear transform of $d_1^2 - d_2^2$ and $d_1^2 - d_3^2$. $B_{1\times 6}$ has different values according to which of the areas of FIG. 8(b) contains the transceiver, and this relationship within the distance vector can be used for the clustering of training data to further classify a distance vector into the correct area. In one implementation of the embodiment, each of the six possible values of $B_{1\times 6}$ are firstly estimated using least square method based on the training data of one group obtained from clustering. Then in the working mode, the metric of:

$$\text{abs}\left(d_1^2 - B_{1\times 6,I}\begin{bmatrix}(d_1^2-d_2^2)^2\\(d_1^2-d_3^2)^2\\(d_1^2-d_2^2)(d_1^2-d_3^2)\\(d_1^2-d_2^2)\\(d_1^2-d_3^2)\\1\end{bmatrix}\right)$$

is used to select the one that minimize this value as the group that current input distance vector belongs to. In this metric, $B_{1\times 6,I}$ is one of the six values estimated in training and I=1, 2, 3, 4, 5, 6. With classifying done, the according linear transformation obtained in the clustering phase can be applied to get the 2D coordinate of the transceiver. The same idea also works for scenarios where more than three point source reflectors exist. Suppose there are N point sources present, there will be N-1 linear constraints between the 2D coordinates (x, y) and the vector $$\begin{bmatrix}d_1^2-d_2^2\\d_1^2-d_3^2\\\vdots\\d_1^2-d_N^2\end{bmatrix},$$

while the relationship between $d_1^2$ and this vector can be used in classifying.

This completes the discussion of the use of the embodiment in the case when the reflections are entirely due to point-like reflective surfaces (e.g. because echoes from other reflective surfaces are not significant). However, the embodiment of FIG. 1 can also be used in the "combined" case, where both planar and point source reflectors exist. If by some means (e.g. the "signature" or unique pulse shape of any of these two), we can separate the echoes from the planar sources and those from point sources, we could just use only one kind of the information, e.g. only distance information from planar reflectors and discarding the information from point sources, to perform the positioning task as long as the information is enough (e.g. more than three planar reflectors exist). It is also straight forward to combine these two information using algorithms similar to what is introduced before for the two individual cases.

If, however, the separation of echoes from two kind of sources by the waveform is impossible, the embodiment is arranged to 1) first identify the number of planar reflectors and point reflectors respectively; 2) separate the components of distance vector into these two groups; 3) finally combine this two kinds of information in positioning.

The first task is done by utilizing the different linear transformations of the mapping between the distance vector and the 2D coordinates of the transceiver's position. With one group of the training data (e.g. for the case in which there N point sources, at least N data points that do not fall in a line), we can first estimate the matrix of transformation $M_{N\times 3}$ between distance vector $(d_{1i}, d_{2i}, \ldots d_{Ni})$ and co-ordinate vector $(x_i, y_i, 1)$ using a least squares method, assuming all the reflectors are planar ones. Then we can calculate the Mean-Square-Error (MSE) of calculated distance vector based on the estimation obtained from this assumption via calculating:

$$E_i = \begin{bmatrix}d_{1i}\\d_{2i}\\\vdots\\d_{Ni}\end{bmatrix} - M_{N\times 3}\begin{bmatrix}x_i\\y_i\\1\end{bmatrix}$$

By comparing each element in $MSE_i$ which is N×1, to a threshold, we can use the number below this threshold as the number of planar reflectors and the number exceeding this threshold as the number of point reflectors. A similar idea can be applied to the vector of $(d_{1i}^2-d_{2i}^2, d_{1i}^2-d_{3i}^2, \ldots, d_{1i}^2-d_{Ni}^2)$ and $(x_i, y_i, 1)$. However, the analysis is more complex and not included here.

After determining the number of these two kinds of reflectors, the combined information of distances from the transceiver to them can be used in positioning, as the next two steps defined previously. To illustrate the ideas and methods, we study a simple case of two point source reflector and one planar reflector, as depicted in FIG. 10, which is composed on FIG. 10(a) and FIG. 10(b).

FIG. 10(a) shows the three components of a distance vector. With $$d_l = \frac{|Ax_P + By_P + C|}{\sqrt{A^2+B^2}}$$

$$d_C = \sqrt{(x_P-x_C)^2+(y_P-y_C)^2}$$

$$d_D = \sqrt{(x_P-x_D)^2+(y_P-y_D)^2}$$

where $Ax+By+C=0$ is the equation of the line l standing for the planar reflector. Again we can form a linear transformation between the distance information and the 2D coordinate as:

$$\begin{bmatrix}d_l\\d_C^2-d_D^2\end{bmatrix} = A_{2\times 3}\begin{bmatrix}x_P\\y_P\\1\end{bmatrix} \quad (12)$$

However, the distance vector that is obtained from the echoes:

$$(d_1, d_2, d_3) = (\min(d_l, d_C, d_D), \text{mid}(d_l, d_C, d_D), \max(d_l, d_C, d_D))$$

will be of different permutation of $d_l, d_C, d_D$ in different areas shown in FIG. 10(b). It is difficult to formulate a linear transform such as (12) because it is not clear which distance component is from the planar object and which is from a point source. To solve this problem, the following method is proposed.

In the training mode, three different combinations of each received vector of distance $(d_1, d_2, d_3)$ can be arranged as $$\begin{bmatrix}d_1\\d_2^2-d_3^2\end{bmatrix}, \begin{bmatrix}d_2\\d_1^2-d_3^2\end{bmatrix} \text{ and } \begin{bmatrix}d_3\\d_1^2-d_2^2\end{bmatrix}.$$

For each group of training data, with index from 1 to K (K≧3), fronm which we are going to estimate the linear transformation, three matrices of transformation $M_1$, $M_2$ and $M_3$ are obtained according to these three possible combinations of distance vector. Then by comparing the total error of respective estimation, we can find the correct combination by choosing the one that gives the least error by assuming a linear transformation property. At the same time, the corresponding estimated matrix is used as the linear transformation for this group of data. In this way, we can successfully separate the components in distance vectors into planar source and point sources. However, there will still be two possible values of the matrix estimated depending on whether $d_C \geqq d_D$ or $d_C \leqq d_D$:

$$\begin{bmatrix} \frac{A}{\sqrt{A^2+B^2}} & \frac{B}{\sqrt{A^2+B^2}} & \frac{C}{\sqrt{A^2+B^2}} \\ 2(x_C - x_D) & 2(y_C - y_D) & (x_D^2 + y_D^2 - x_C^2 - y_C^2) \end{bmatrix} \text{ and }$$

$$\begin{bmatrix} \frac{A}{\sqrt{A^2+B^2}} & \frac{B}{\sqrt{A^2+B^2}} & \frac{C}{\sqrt{A^2+B^2}} \\ 2(x_D - x_C) & 2(y_D - y_C) & (x_C^2 + y_C^2 - x_D^2 - y_D^2) \end{bmatrix}$$

where $Ax+By+C=0$ is the equation of the line l standing for the planar reflector. The clustering of these two different cases can be done by self-organizng neural networks again. Using the matrix values (re-arranged in vector form) as inputs, the self-organizing neural network is able to learn to cluster all inputs into two clusters.

In this way, the clustering of training data into 6 different groups is achieved by the combination of these two steps. Then the linear transformation for each group of the training data can be easily obtained using a least squares method.

While in the working mode, the classifying is done through another dimension of information again, like the case in which there are only point sources. This is because for example in the case where $$\begin{bmatrix} d_1 \\ d_2^2 - d_3^2 \end{bmatrix}$$

is the correct combination of distance components from planar source and point sources, $d_2^2$ can again be formulated by a linear transformation of $(d_1^2, (d_2^2-d_3^2)^2, d_1(d_2^2-d_3^2), d_1, (d_2^2-d_3^2), 1)$ since $d_1$ and $(d_2^2-d_3^2)$ are both a linear transformation of x, y and $$d_2^2 = (x_P - x_C)^2 + (y_P - y_C)^2 \text{ or}$$

$$d_2^2 = (x_P - x_D)^2 + (y_P - y_D)^2.$$

There are only two different possible values of this linear transformation and they can also be estimated using the clustering results on the training data. When classifying a distance vector obtained from the echoes in working mode, firstly the distance vector is tried with all the three possible combinations:

$$\begin{bmatrix} d_1 \\ d_2^2 - d_3^2 \end{bmatrix}, \begin{bmatrix} d_2 \\ d_1^2 - d_3^2 \end{bmatrix} \text{ and } \begin{bmatrix} d_3 \\ d_1^2 - d_2^2 \end{bmatrix}.$$

In each combination, the additional information of distance, i.e. the relationship between $d_2^2$, $d_1^2$, $d_1^2$ respectively and these vectors is tested by those two values estimated in the training mode. From all the six cases (three different combinations of distance vector components and two different quadrature formulations), the distance vector can be classified into the correct group and be applied with the corresponding linear transformation learned in the training mode. The full positioning problem is then solved. The whole procedure has been verified in simulations.

As discussed above, the core idea of the proposed positioning method, to exploit the information of geometric constraint hidden in the echoes reflected from several static objects, is the same when extended to include cases of point sources. The major steps, clustering of training data and learning the linear transformations in training mode; classifying a real-time echo and applying the according linear transformation in the working mode, apply to all applications of the embodiment discussed above.

Although the invention has been described above with reference to the above embodiments, many other embodiments are possible within the scope of the invention, as will be clear to a skilled reader. For example, it will be obvious to a skilled man that the neural networks used in the embodiments are only examples of the broader scope of transformation learning technologies.

APPENDIX I

Statement:

"Given an arbitrary acute triangle which is not isosceles and a point within the triangle, the distance vector is defined as the distances from the point to the three sides of the triangle in ascending order, there is a one-to-one mapping between the point position and the distance vector."

(1) It is obvious that given a point, there is only one vector of distances.

(2) Suppose that there is a distance vector $(d_1, d_2, d_3)$ with $d_1 \leqq d_2 \leqq d_3$, it has to be proven that there is only one point within a triangle which gives this distance vector.

Assume that there are two points $(x_1, y_1)$ and $(x_2, y_2)$ which give the same distance vector $(d_1, d_2, d_3)$. If the distance to the three sides AB, BC and AC to the first point are labelled $d_{AB1}$, $d_{AC1}$ and $d_{BC1}$ respectively, and the distances to from the three sides to the second point are labelled $d_{AB2}$, $d_{AC2}$ and $d_{BC2}$, without loss of generality, there are only three possibilities:

$$(a) \begin{cases} d_{AB1} = d_{AB2} \\ d_{AC1} = d_{AC2} \\ d_{BC1} = d_{BC2} \end{cases};$$

$$(b) \begin{cases} d_{AB1} = d_{AB2} \\ d_{AC1} = d_{BC2} \text{ and} \\ d_{BC1} = d_{AC2} \end{cases}$$

$$(c) \begin{cases} d_{AB1} = d_{BC2} \\ d_{AC1} = d_{AB2} \\ d_{BC1} = d_{AC2} \end{cases}.$$

For case (a) it is easy to prove the two points will be identical as shown in FIG. 11. If two lines are drawn parallel to AB and AC, with distance $d_{AB1}=d_{AB2}$ and $d_{AC1}=d_{AC2}$ to them respectively, both points must lie on these two lines concurrently. Since there will be only one intersection for two straight lines, the uniqueness is proved (see FIG. 11).

For case (b) the situation is shown in FIG. 12, where FG//AB, PD⊥AC, PE⊥BC, P'D'⊥BC, P'E'⊥AC and PD=P'D', PE=PE'. It follows that PD/IP'E' and PE//P'D', and therefore $$\frac{FP}{FP'} = \frac{PD}{P'E'} = \frac{P'D'}{PE} = \frac{GP'}{GP}.$$

Since FP'=FP+PP' and GP=GP'+PP', it can be further deduced that FP=GP'. Then together with PD=P'D', we obtain ΔPFD≅ΔP'GD'. As a result ∠DFP=∠D'GP'. Since FG//AB, ∠DFP=∠A and ∠D'GP'=∠B, it is shown that the two points do not coincide only when the triangle is an isosceles one. On the other hand, if this condition is satisfied, it means that there is existing symmetry in the geometry of the triangle and there are at least two different points with same vector of distances.

Case (c) can be proven by calculation of the three distances. Without loss of generality, the triangle and the coordinate systems is aligned as shown in FIG. 12. Then the distance from a point (x,y) to the three sides AB, BC and AC, respectively, is:

$$d_{AB} = y$$

$$d_{BC} = \frac{|y_C x - (x_C - x_B)y - x_B y_C|}{\sqrt{y_C^2 + (x_C - x_B)^2}}$$

$$d_{AC} = \frac{|y_C x - x_C y|}{\sqrt{x_C^2 + y_C^2}}$$

and following equations must hold.
(i) For (x1,y1):

$$\left[\frac{x_B * y_C}{BC} - \frac{y_C}{AC}\right]x_1 + \left[\frac{AC * BC - x_B * (x_C - x_B)}{BC^2} + \frac{x_C}{AC}\right]y_1 - \frac{x_B * y_C * (x_B + BC)}{BC^2} = 0 \quad (1)$$

(ii) For (x2,y2):

$$\begin{cases} y_2 = \dfrac{y_C * x_1 - (x_C - x_B) * y_1 - x_B * y_C}{BC} \\ y_C * x_2 - x_C * y_2 = y_1 * AC \end{cases} \quad (2)$$

Equation (1) describes a line that (x1,y1) must fall on given case (c) and equation (2) describes (x2,y2) if (x1,y1) is given in case (c). It can be proved using algebra that it is impossible for both points to be within the triangle.

By cases (a), (b) and (c), the uniqueness of a point corresponding to a vector of distances $(d_1, d_2, d_3)$ is proved, given that the triangle is not isosceles. Combining (1) and (2) the statement is proved.

For the polygon with 4 sides, similar reasoning can divide the possibility of following cases (where AB, BC, CD and DA are the four sides):

a) At least two distances to two respective sides are equal, such as $$\begin{cases} d_{AB1} = d_{AB2} \\ d_{BC1} = d_{BC2} \\ d_{CD1} = d_{DA2} \\ d_{DA1} = d_{CD2} \end{cases}.$$

b) Only one distance to a side are equal, including $$\begin{cases} d_{AB1} = d_{AB2} \\ d_{BC1} = d_{CD2} \\ d_{CD1} = d_{DA2} \\ d_{DA1} = d_{BC2} \end{cases} \text{ and } \begin{cases} d_{AB1} = d_{AB2} \\ d_{BC1} = d_{DA2} \\ d_{CD1} = d_{BC2} \\ d_{DA1} = d_{CD2} \end{cases}$$

c) Two vector-of-distances' elements are of totally different permutation, including:

$$\begin{cases} d_{AB1} = d_{BC2} \\ d_{BC1} = d_{CD2} \\ d_{CD1} = d_{DA2} \\ d_{DA1} = d_{AB2} \end{cases}, \begin{cases} d_{AB1} = d_{BC2} \\ d_{BC1} = d_{AB2} \\ d_{CD1} = d_{DA2} \\ d_{DA1} = d_{CD2} \end{cases}, \begin{cases} d_{AB1} = d_{BC2} \\ d_{BC1} = d_{DA2} \\ d_{CD1} = d_{AB2} \\ d_{DA1} = d_{CD2} \end{cases}, \begin{cases} d_{AB1} = d_{CD2} \\ d_{BC1} = d_{AB2} \\ d_{CD1} = d_{DA2} \\ d_{DA1} = d_{BC2} \end{cases}$$

$$\begin{cases} d_{AB1} = d_{CD2} \\ d_{BC1} = d_{DA2} \\ d_{CD1} = d_{AB2} \\ d_{DA1} = d_{BC2} \end{cases}, \begin{cases} d_{AB1} = d_{CD2} \\ d_{BC1} = d_{AB2} \\ d_{CD1} = d_{BC2} \\ d_{DA1} = d_{AB2} \end{cases}, \begin{cases} d_{AB1} = d_{DA2} \\ d_{BC1} = d_{AB2} \\ d_{CD1} = d_{BC2} \\ d_{DA1} = d_{CD2} \end{cases}, \begin{cases} d_{AB1} = d_{DA2} \\ d_{BC1} = d_{CD2} \\ d_{CD1} = d_{AB2} \\ d_{DA1} = d_{BC2} \end{cases}$$

and $$\begin{cases} d_{AB1} = d_{DA2} \\ d_{BC1} = d_{CD2} \\ d_{CD1} = d_{BC2} \\ d_{DA1} = d_{AB2} \end{cases}$$

For case (a) the uniqueness of the vector of distance can be proven in the same manner as for a triangle.

For cases (b) and (c), it can be proven by calculation that there is at most only a pair of vectors that satisfy any of the cases. Even when a solution for two different points exists, these two points are either identical (in case b) or cannot be within the polygon at the same time (as in case c), given that there is no symmetry in the polygon (e.g. FIG. 13, shows an example of a pair of problematic points) and there are no parallel sides (e.g. FIG. 14 shows an example of pair of problematic points).

For a polygon with more than 4 sides, i.e. N>4, the condition for two points in the polygon corresponding to the same vector of distance can be written as:

$$M_{N\times 3}\begin{pmatrix} x \\ y \\ 1 \end{pmatrix} = M'_{N\times 3}\begin{pmatrix} x' \\ y' \\ 1 \end{pmatrix}$$

where M stands for the matrix with each row the function of the line of each side with coordinates of x and y normalised; M' is made up of rows of M with a certain permutation.

If M and M' are written as:

$$(M_1 | M_2)_{N \times 2 | N \times 1} \text{ and } (M'_1 | M'_2)_{N \times 2 | N \times 1},$$

the equation can then be further re-written as:

$$(M_1 - M'_1)_{N \times 4} \begin{pmatrix} x \\ y \\ x' \\ y' \end{pmatrix} = (M_2 - M'_2)_{N \times 1} \text{ or } A \begin{pmatrix} x \\ y \\ x' \\ y' \end{pmatrix} = B.$$

If N>5, there will be no solution to this equation unless the according rows in A and B are proportional. This is impossible based on the definition of M and M' and the assumption that there is no symmetry in the polygon and no parallel sides.

APPENDIX II

Appendix II is a discussion of the uniqueness problem in a point source scenario.

Problem:

"Given an arbitrary triangle (having three vertices which are not on one line) which is not isosceles and a point within the plane of the triangle (not necessarily within the triangle), the distance vector is defined as aligning the values of distance from the point to the three vertices of the triangle in ascending order. Discuss the uniqueness of mapping between the point position and the distance vector. Further discuss the extension of this hypothesis to polygons with more than 3 sides. Further discuss the case with both planar and point reflection sources.

Discussion:

1) It is obvious that given a point, there is only one distance vector.

2) Suppose we have a distance vector $(d_1, d_2, d_3)$ with $d_1 \leq d_2 \leq d_3$, we need to prove that there's only one point within the triangle that gives this distance vector. Assume there are two points $(x_1, y_1)$ and $(x_2, y_2)$ give the same distance vector $(d_1, d_2, d_3)$. If we mark the distance to the three vertices A, B and C as $d_A$, $d_B$ and $d_C$ respectively. Without loss of generality, there are only three possibilities:

$$\begin{cases} d_{A1} = d_{A2} \\ d_{B1} = d_{B2} \\ d_{C1} = d_{C2} \end{cases} \quad \text{a)}$$

$$\begin{cases} d_{A1} = d_{C2} \\ d_{B1} = d_{B2} \text{ and} \\ d_{C1} = d_{A2} \end{cases} \quad \text{b)}$$

$$\begin{cases} d_{A1} = d_{B2} \\ d_{B1} = d_{C2} \\ d_{C1} = d_{A2} \end{cases} \quad \text{c)}$$

For case a) it's easy to prove the two points will be identical, as shown in FIG. 15. If we draw two circles with center at A and B, with radius $d_{A1} = d_{A2}$ and $d_{B1} = d_{B2}$ to them respectively, both points must lie on these two circles concurrently. Since there are at most two intersections of two circles, the two points are either identical or just the two intersections P and Q. If it is the latter case, since $d_{C1} = d_{C2}$, point C must be on the perpendicular bisector of PQ. On the other hand, A and B are also both on the perpendicular bisector of PQ and this means A, B and C are on one line. This is contradictory to our assumptions thus is impossible. Then the two points must be identical, as one of the intersections of the two circles.

For case b), which is illustrated in FIG. 16, since $d_{B1} = d_{B2}$, the two points have to be on the circle with centre at B and radius of $d_{B1} = d_{B2}$. Call the two points P and Q and we have PA=QC and PC=QA since $d_{A1} = d_{C2}$ and $d_{C1} = d_{A2}$. Then with a common side of AC, we have $\triangle APC \cong \triangle AQC$. As a consequence, $\angle PAC = \angle QCA$ and APQC is an isosceles trapezoid. Then the perpendicular bisector of AC coincides with that of PQ because of the symmetry of isosceles trapezoid. However, the perpendicular bisector of PQ goes through point B since P and Q are two points on a circle centered at B. Then we have the conclusion that B lies on the perpendicular bisector of AC, which means that ABC is an isosceles triangle and this is opposite to our assumption. Thus P and Q must be identical.

For case c), calculations based on analytical geometry are needed for the analysis. Suppose we have two points $P(x_1, y_1)$ and $Q(x_2, y_2)$ satisfying this constraint, we have.

$$(x_1 - x_A)^2 + (y_1 - y_A)^2 = (x_2 - x_B)^2 + (y_2 - y_B)^2 \quad \text{(i)}$$

$$(x_1 - x_B)^2 + (y_1 - y_B)^2 = (x_2 - x_C)^2 + (y_2 - y_C)^2 \quad \text{(ii)}$$

$$(x_1 - x_C)^2 + (y_1 - y_C)^2 = (x_2 - x_A)^2 + (y_2 - y_A)^2 \quad \text{(iii)}$$

By subtracting (ii) and (iii) from (i) respectively, we can obtain:

$$2(x_B - x_A)x_1 + 2(y_B - y_A)y_1 + (x_A^2 + y_A^2 - x_B^2 - y_B^2) = \\ 2(x_C - x_B)x_2 + 2(y_C - y_B)y_2 + (x_B^2 + y_B^2 - x_C^2 - y_C^2) \quad \text{(iv)}$$

$$2(x_C - x_A)x_1 + 2(y_C - y_A)y_1 + (x_A^2 + y_A^2 - x_C^2 - y_C^2) = \\ 2(x_A - x_B)x_2 + 2(y_A - y_B)y_2 + (x_B^2 + y_B^2 - x_A^2 - y_A^2) \quad \text{(v)}$$

From (iv) and (v), we can see that there is a linear transformation between the coordinates of $(x_1, y_1)$ and $(x_2, y_2)$. We can express $(x_2, y_2)$ as a result of linear transformation of $(x_1, y_1)$ and substitute into (i) to obtain a second-order equation regarding the coordinates of P. By calculation, it can be proved that actually P must lie on a hyperbola with the parameters determined by the coordinates of the three points A, B and C. Accordingly, Q lies on another hyperbola, linear transformation of the locus of P.

In contrast to the case of planar objects, there is no way to limit the position of the transceiver within the triangle of ABC, thus really there exist two pairs of hyperbola locus (since there is another case where $$\begin{cases} d_{A1} = d_{C2} \\ d_{B1} = d_{A2} \\ d_{C1} = d_{B2} \end{cases},$$

where for each point on one of the hyperbola, there is a counterpart on the other hyperbola of the pair that gives the exact same distance vector. However, since this only happen for extreme cases, our method may still be valid for general cases. This has been partially proved in our simulation results.

With four point sources, it can be similarly induced that there are at most two pairs of single points with equivalent distance vector (since there is one more degree of constraint). While with no less than five point sources, the mapping of 2D coordinates of a point and the distance vector is unique, given that the polygon formed by the five points are with parallel sides and of any symmetry.

For the scenarios where both planar sources and point sources exist, similar discussion can be made. The key point is the number of total reflection sources. With more reflectors, the constraint on the distance vector will be stricter. With no less than five reflectors (no matter from planar source, or point source), there is a one-to-one mapping between the 2D coordinates and the distance vector.

With a number of three to four reflectors, there is possibility of two different points giving the same distance vector in theory. However, even in this case, as we have shown previously, it only happens on extreme case of single curves and may not influence the effectiveness of the embodiments of the invention.

The invention claimed is:

1. A system comprising:
   a transmitter for transmitting wireless signals in all directions within a range of directions, the range of directions including at least all directions in a plane;
   a receiver for receiving echoes of the wireless signals from any direction in the range;
   a processor for processing the received echoes to derive echo data signals indicative of the distance of the system to a plurality of reflective surfaces;
   an adaptive system for:
   during a training stage, learning at least one association between the echo data signals and the position of the system based on training data composed of records of echo data signals and associated system position data, and
   during a working stage, using the echo data signals and the learnt association to determine the position of the system; and
   a clustering and classifying unit, the clustering and classifying unit being arranged:
   during the training stage, to partition the echo data signals of the training data into clusters, the adaptive system learning an association for each cluster between the echo data signals of that cluster and the associated positions of the system,
   wherein a linear transformation between a vector of distances and two-dimensional coordinates are estimated for a corresponding cluster,
   wherein the linear transformation between the distance vector and the two-dimensional coordinates are estimated for a variable amount of training points, and wherein the accuracy of the estimations is a function of a selection of the points; and
   during the working stage, to determine which cluster the echo data signals belong to, whereby the adaptive system determines the position of the system using the learnt association of the corresponding cluster.

2. A system according to claim 1 in which the processor includes a distance vector determination unit for providing the echo data signals comprising numbers which indicate the distances from the system to each of a number of respective reflective surfaces.

3. A system according to claim 1 in which the processor in includes a distance vector determination unit for providing the echo data signals comprising numbers which indicate the difference of the squares of the distances of the system to a respective pair of the reflective surfaces.

4. A system according to claim 1, in which the processor is arranged to modify the relationship between the echoes and the echo data signals to generate echo data signals comprising a plurality of numbers having linear relationships to position values of the system measured relative to Cartesian axes.

5. A system according to claim 1 in which the clustering and classifying unit includes a clustering unit adapted during the training stage to derive a cluster index indicative of a cluster associated with the echo data signals, and a classifying unit arranged during the training stage to learn associations between the echo data signals and the cluster indices and during the working phase to output a cluster index based on the echo data signals.

6. A system according to claim 5 in which the classifying unit is arranged to employ a learning vector quantization algorithm.

7. A system according to claim 6 in which the clustering unit during the training stage is arranged to take as input a vector comprising the echo data signals and the associated positions.

8. A system according to claim 6 in which the clustering unit during the training stage is arranged to take as input a vector comprising a linear transformation derived from the echo data signals and associated positions.

9. A system according to claim 1 in which the adaptive system includes at least one neural network.

10. A system according to claim 1 in which the adaptive system includes a neural network for each cluster, the neural network being trained using training data for the corresponding cluster to learn the association for echo data signals of the corresponding cluster.

11. A system according to claim 10 in which each neural network is a two-layer network.

12. A system according to claim 11 in which each neural network performs a linear function of its inputs.

13. A system according to claim 1 in which the adaptive system includes for each cluster a respective transformation unit adapted during the training stage to derive a respective linear transformation of its inputs.

14. A system according to claim 13 in which the transformation units derive the linear transformation by a least squares algorithm based on (i) vectors of distances as an input and (ii) positions associated with the echo data signals as outputs.

15. A system according to claim 1 in which the signals are RF wireless signals.

16. A system according to claim 15 in which the transmitter is an omni-directional antenna.

17. A method of determining the position of an object, the method comprising:
   transmitting wireless signals from the object in all directions within a range of directions which includes at least all directions in a plane;
   receiving at the object echoes of the wireless signals from any of the range of directions;
   processing the received echoes to derive echo data signals indicative of the distance of the object to a plurality of reflective surfaces;
   during a training stage, learning at least one association between the echo data signals and the position of the system based on echo data signals and associated object position data,
   during a working stage, using the echo data signals and the learnt association to determine the position of the object; and
   during the training stage, partitioning echo data signals of the training data into clusters, the adaptive system learning an association for each cluster between the echo data signals of that cluster and the associated positions of the object, wherein a linear transformation between a distance vector and two-dimensional coordinates are estimated for a corresponding cluster, wherein the linear transformation between the distance vector and the two-dimensional coordinates are estimated for a variable amount of training points, and wherein the accuracy of the estimations is a function of a selection of the points; and during the working stage, determining which cluster the echo data signals belong to, whereby the adaptive system determines the position of the object using the learnt association of the corresponding cluster.

18. A method according to claim 17 in which the echo data signals comprise numbers having linear relationships to position values of the object measured relative to Cartesian axes.

19. A method according to claim 17 in which the echo data comprise signals indicate the distances from the object to each of a number of respective reflective surfaces.

20. A method according to claim 18 in which the echo data comprise signals that indicate the distances from the object to each of a number of respective reflective surfaces and in which the respective reflective surfaces are substantially planar.

21. A method according to claim 17 in which the echo data signals comprise numbers which indicate the difference of the squares of the distances of the system to a respective pair of the reflective surfaces.

22. A method according to claim 18 in which the echo data signals comprise numbers which indicate the difference of the squares of the distances of the system to a respective pair of the reflective surfaces, and in which the respective reflective surfaces are point-like reflectors.

23. A method according to claim 18 including a step of determining a transform from the echoes to the echo data signals according to the nature of the reflective surfaces.

24. A method according to claim 17 in which: during the training stage a clustering unit derives a cluster index indicative of a cluster associated with the echo data signals, and a classifying unit learns associations between the echo data signals and the cluster indices, and during the working phase to output a cluster index based on the echo data signals.

25. A method according to claim 24 in which the classifying unit employs a learning vector quantization algorithm.

26. A method according to claim 25 in which the clustering unit takes as input a vector comprising the echo data signals and the associated positions.

27. A method according to claim 25 in which the clustering unit takes as input a vector comprising a linear transformation derived from the echo data signals and associated positions.

28. A method according to claim 17 in which the learning is at least partly performed by at least one neural network.

29. A method according to claim 17 which employs a neural network for each cluster, the neural network being trained using training data for the corresponding cluster to learn the association for echo data signals of the corresponding cluster.

30. A method according to claim 29 in which each neural network is a two layer network.

31. A method according to claim 30 in which each neural network performs a linear function of its inputs.

32. A method according to claim 17 in which the adaptive system includes for each cluster a respective transformation unit which during the training stage derives a respective linear transformation of its inputs.

33. A method according to claim 32 in which the transformation units derive the linear transformation by a least squares algorithm based on (i) vectors of distances as an input and (ii) positions associated with the echo data signals as outputs.

34. A method according to claim 17 in which the range of directions is all directions within a three-dimensional space.

* * * * *